US012755637B2

(12) United States Patent
Cabral et al.

(10) Patent No.: US 12,755,637 B2
(45) Date of Patent: Oct. 6, 2026

(54) PILOT COGNITIVE INFERENCE SYSTEM AND METHOD

(71) Applicant: THE BOEING COMPANY, Arlington, VA (US)

(72) Inventors: Kailah Brianne Cabral, Allston, MA (US); Charles Luke Burks, Cambridge, MA (US); Lisa Anne Zahray, Cambridge, MA (US); Aaron Paul Ott, Belmont, MA (US); Alyssa Bekai Rose, Chelmsford, MA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/965,620

(22) Filed: Dec. 2, 2024

(65) Prior Publication Data

US 2026/0155048 A1 Jun. 4, 2026

(51) Int. Cl.

*G08G 5/23* (2025.01)
*G06F 3/01* (2006.01)
*G06N 7/01* (2023.01)
*G08G 5/21* (2025.01)

(52) U.S. Cl.

CPC ............... *G08G 5/23* (2025.01); *G06F 3/013* (2013.01); *G06N 7/01* (2023.01); *G08G 5/21* (2025.01)

(58) Field of Classification Search

None

See application file for complete search history.

(56) References Cited

U.S. PATENT DOCUMENTS

| | | | | |
|---|---|---|---|---|
| 10,481,683 | B2 * | 11/2019 | Chae | A61B 5/16 |
| 2011/0212422 | A1 * | 9/2011 | O'Donnell | G09B 7/02 434/236 |
| 2012/0075119 | A1 * | 3/2012 | Dorneich | G06Q 10/06 340/945 |
| 2012/0075123 | A1 * | 3/2012 | Keinrath | A61B 5/163 340/963 |
| 2014/0178843 | A1 * | 6/2014 | Smyth | G09B 19/00 434/238 |
| 2016/0027336 | A1 * | 1/2016 | Towers | G09B 9/10 434/220 |
| 2017/0129335 | A1 * | 5/2017 | Lu | B60W 50/10 |
| 2017/0129497 | A1 * | 5/2017 | Zilberman | B60K 28/00 |
| 2017/0316330 | A1 * | 11/2017 | Cohen | G06F 1/163 |

(Continued)

OTHER PUBLICATIONS

Extended European Search Report for application No. 25212967.1 dated Feb. 24, 2026, pp. 1-5.

(Continued)

*Primary Examiner* — Muhammad Adnan
(74) *Attorney, Agent, or Firm* — Moore IP Law

(57) ABSTRACT

A system for determining pilot cognitive states, includes one or more processors coupled to a memory configured to receive physiological data and aircraft state data, determine mental workload and mental fatigue of a pilot based on the physiological data, determine available attention resources of the pilot based on the mental workload and mental fatigue, determine attention allocation of the pilot based on the available attention resources and gaze patterns derived from the physiological data, determine situational awareness of the pilot based on the attention allocation and the aircraft state data, and generate a visualization of the available attentional resources of the pilot, the attention allocation of the pilot, the situational awareness of the pilot, and aircraft state data.

20 Claims, 9 Drawing Sheets

(56) References Cited

U.S. PATENT DOCUMENTS

| | | | | |
|---|---|---|---|---|
| 2017/0316707 | A1* | 11/2017 | Lawrenson | G06F 3/013 |
| 2018/0072327 | A1* | 3/2018 | Seppelt | B60W 50/14 |
| 2019/0090800 | A1* | 3/2019 | Bosworth | A61B 5/0015 |
| 2019/0092337 | A1* | 3/2019 | Chua | B60W 30/14 |
| 2019/0250408 | A1* | 8/2019 | Lafon | G02B 27/017 |
| 2020/0261017 | A1* | 8/2020 | Ruwe | A61B 5/0205 |
| 2020/0357289 | A1* | 11/2020 | Blom | G06F 16/2379 |
| 2021/0034053 | A1* | 2/2021 | Nikolic | G08G 5/22 |
| 2021/0077006 | A1* | 3/2021 | Salti | A61B 5/1112 |
| 2021/0241654 | A1* | 8/2021 | Onur | G09B 19/165 |
| 2023/0373299 | A1* | 11/2023 | Nagtegaele | B60K 35/23 |
| 2023/0410674 | A1* | 12/2023 | Lawrenson | G06F 3/013 |
| 2024/0400083 | A1* | 12/2024 | Samani | B60W 40/08 |
| 2025/0352148 | A1* | 11/2025 | Rajavenkatanarayanan | A61B 5/7264 |

OTHER PUBLICATIONS

Feng, Chuanyan et al., "A comprehensive prediction and evaluation method of pilot workload," Technology and Health Care 26, 2018, DOI 10.3233/THC-174201, pp. S65-S78.

Qin, Guo-Jie et al., "Combined ergonomics evaluation based on touch HMI of airborne-mission-system," 2003 International Conference on Computer Applications Technology (CCAT), IEEE, 2023, 10.1109/CCAT59108.2023.00041, pp. 184-189.

Charles, Rebecca et al., "Measuring mental workload using physiological measures: A systematic review," Applied Ergonomics, vol. 74, Jan. 2019, pp. 221-232, DOI: 10.1016/j.apergo.2018.08.028.

Hu, Xinyun et al., "Detecting fatigue in car drivers and aircraft pilots by using non-invasive measures: The value of differentiation of sleepiness and mental fatigue," Journal of Safety Research, vol. 72, 2020, pp. 173-187, DOI: 10.1016/j.jsr.2019.12.015.

Nguyen Thanh et al., "A Review of Situation Awareness Assessment Approaches in Aviation Environments," IEEE Systems Journal, Jun. 2019, pp. 1-15, DOI: 10.1109/JSYST.2019.2918283.

Peibßl, Sylvia et al., "Eye-Tracking Measures in Aviation: A Selective Literature Review", The International Journal of Aerospace Psychology, 2018, vol. 28, Nos. 3-4, pp. 98-112, https://doi.org/10.1080/24721840.2018.1514978.

* cited by examiner

PILOT COGNITIVE INFERENCE SYSTEM AND METHOD

FIELD OF THE DISCLOSURE

The present disclosure is generally related to a pilot cognitive inference system and method.

BACKGROUND

Pilots can experience various cognitive challenges during flight, including mode confusion and spatial disorientation, which can lead to critical errors in aircraft operation. Mode confusion occurs when a pilot's mental model of the aircraft's automation state differs from the actual state, often due to the increasing complexity of flight deck automation. This can result in inappropriate control inputs or failure to respond to changing flight conditions. Similarly, spatial disorientation can arise when a pilot's perception of the aircraft's position, attitude, or motion differs from reality. These cognitive discrepancies can stem from a variety of factors, including mental fatigue, high workload, attentional lapses, and the limitations of human information processing in dynamic, multitasking environments.

Certain previous approaches to addressing these issues relied on standardized training and procedural measures, without incorporating real-time physiological data or personalized cognitive assessments. These types of methods have not considered the unique cognitive and physiological characteristics of each pilot. This lack of personalized data has limited the ability to accurately detect and respond to cognitive challenges as they arise during flight operations.

The potential for such cognitive misalignments poses significant risks to flight safety, particularly in situations requiring rapid decision-making or when pilots are operating with reduced crew complements. Without a way to account for individual differences between pilots, it has been challenging to develop effective real-time interventions that can mitigate these risks.

SUMMARY

According to one implementation of the present disclosure, a system for determining pilot cognitive states, includes one or more processors coupled to a memory configured to receive physiological data and aircraft state data, determine mental workload and mental fatigue of a pilot based on the physiological data, determine available attention resources of the pilot based on the mental workload and mental fatigue, determine attention allocation of the pilot based on the available attention resources and gaze patterns derived from the physiological data, determine situational awareness of the pilot based on their attention allocation and the aircraft state data, and generate a visualization of the available attentional resources of the pilot, the attention allocation of the pilot, the situational awareness of the pilot, and aircraft state data.

According to another implementation of the present disclosure, a method for determining pilot cognitive states, includes receiving, from a plurality of sensors, physiological data from a pilot. The method further includes receiving, from an aircraft state data generator, aircraft state data. The method further includes determining mental workload and mental fatigue of the pilot based on the physiological data. The method further includes determining available attentional resources of the pilot based on the mental workload and mental fatigue. The method further includes determining attention allocation of the pilot based on the available attentional resources and gaze patterns derived from the physiological data. The method further includes determining situational awareness of the pilot based on the attention allocation and the aircraft state data. The method further includes generating a visualization of the available attentional resources of the pilot, the attention allocation of the pilot, the situational awareness of the pilot, and aircraft state data.

According to another implementation of the present disclosure, a non-transitory computer-readable medium storing instructions that, when executed by one or more processors, cause the one or more processors to determine mental workload and mental fatigue of a pilot based on physiological data. The instructions further cause the one or more processors to determine available attentional resources of the pilot based on the mental workload and the mental fatigue. The instructions further cause the one or more processors to determine attention allocation of the pilot based on the available attentional resources and gaze patterns derived from the physiological data. The instructions further cause the one or more processors to determine situational awareness of the pilot based on the attention allocation and flight data. The instructions further cause the one or more processors to generate a visualization of the available attentional resources of the pilot, the attention allocation of the pilot, the situational awareness of the pilot, and aircraft state data.

The features, functions, and advantages described herein can be achieved independently in various implementations or may be combined in yet other implementations, further details of which can be found with reference to the following description and drawings.

DETAILED DESCRIPTION

Figure 1:
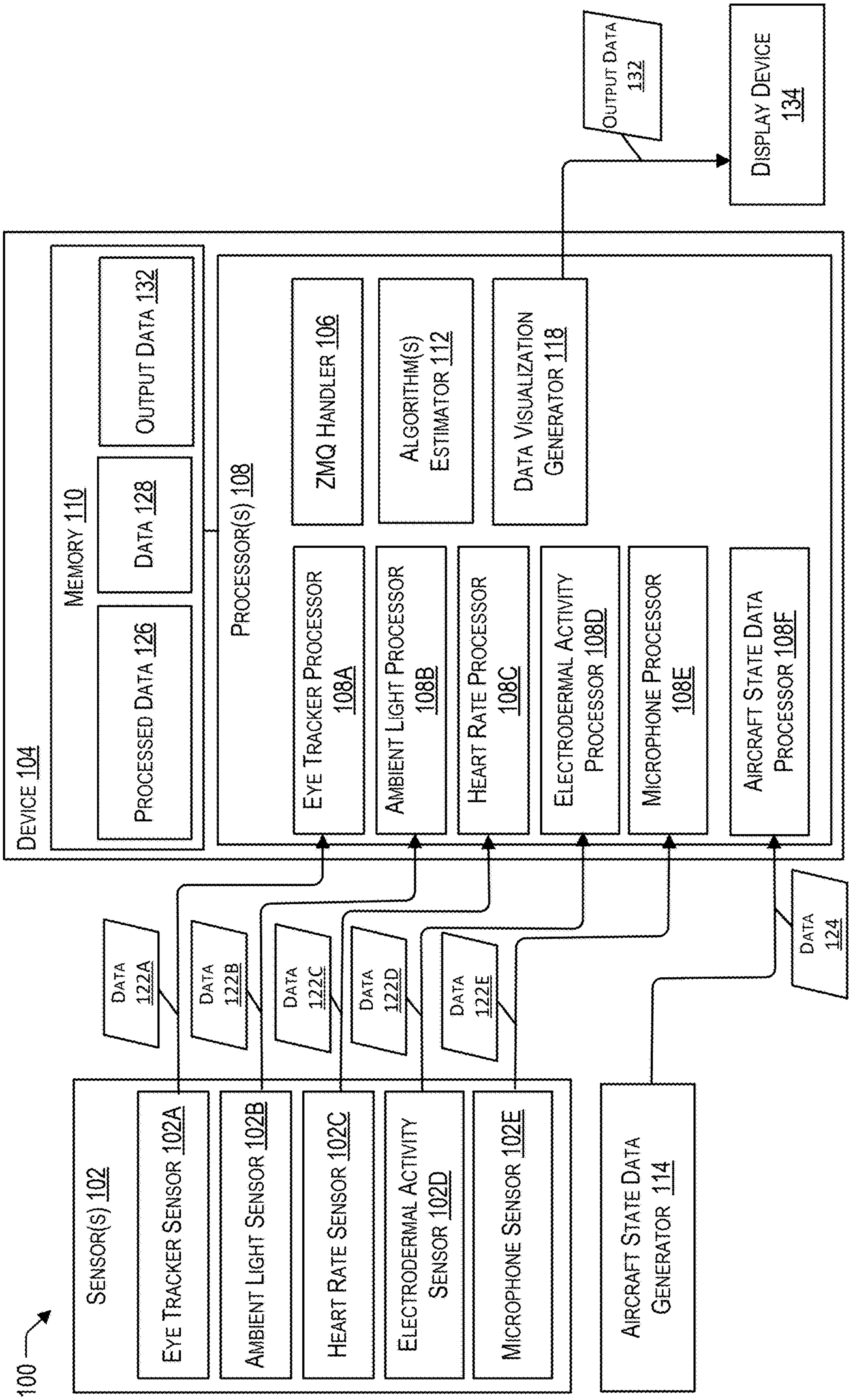
FIG. 1 is a diagram that illustrates a pilot cognitive inference system.

Aspects disclosed herein present systems, apparatus, and methods that monitor pilots to help prevent incidents caused by confusion or misunderstanding in the cockpit. The system uses various sensors to measure things like a pilot's eye movements, heart rate, and skin responses. It also collects data about the aircraft's current state, such as its altitude, speed, and orientation.

All of this information is processed by the pilot monitoring system that analyzes the data to determine the pilot's mental state. The system looks at factors like how tired or stressed the pilot might be, how much mental workload they're experiencing, and how well they're paying attention to important information. The system uses this information to detect whether the pilot is likely experiencing mode confusion. Mode confusion happens when a pilot misunderstands what the aircraft's systems are doing. For example, a pilot might think the autopilot is engaged when it actually isn't. If the system detects that a pilot might be experiencing mode confusion, the system can alert the pilot and/or activate one or more controls, such as autopilot. The system can also create visual displays of the pilot's mental state and any detected confusion, which could be useful for training or review purposes.

The system uses one or more algorithms to determine a cognitive state of the pilot, which is used to detect mode confusion. For example, one or more of the algorithms can be configured to track what information the pilot has likely seen based on where they've been looking. Another algorithm can estimate what phase of the flight the aircraft is in (e.g., takeoff, cruising, or landing) based on the aircraft's data. These algorithms work together to build a comprehensive picture of the pilot's awareness and the current situation.

By using the techniques and systems described herein, the safety of air travel is improved as the pilot monitoring systems assists pilots in maintaining better situational awareness, and ultimately reduce the risk of incidents caused by human error or misunderstanding of complex aircraft systems. Furthermore, the data and insights gathered from this system can be used to enhance and refine underlying avionics systems, including improving the autopilot's functionality and user interface. This iterative process of monitoring, analysis, and improvement can lead to more intuitive and error-resistant aircraft systems, further reducing the potential for mode confusion and enhancing overall flight safety The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple sensors 102 are illustrated and associated with reference numbers 102A, 102B, 102C, 102D and 102E. When referring to a particular one of these deployable data recorder systems, such as the eye tracker sensor 102A, the distinguishing letter "A" is used. However, when referring to any arbitrary one of these sensors, the reference number 102 is used without a distinguishing letter.

Figure 9:
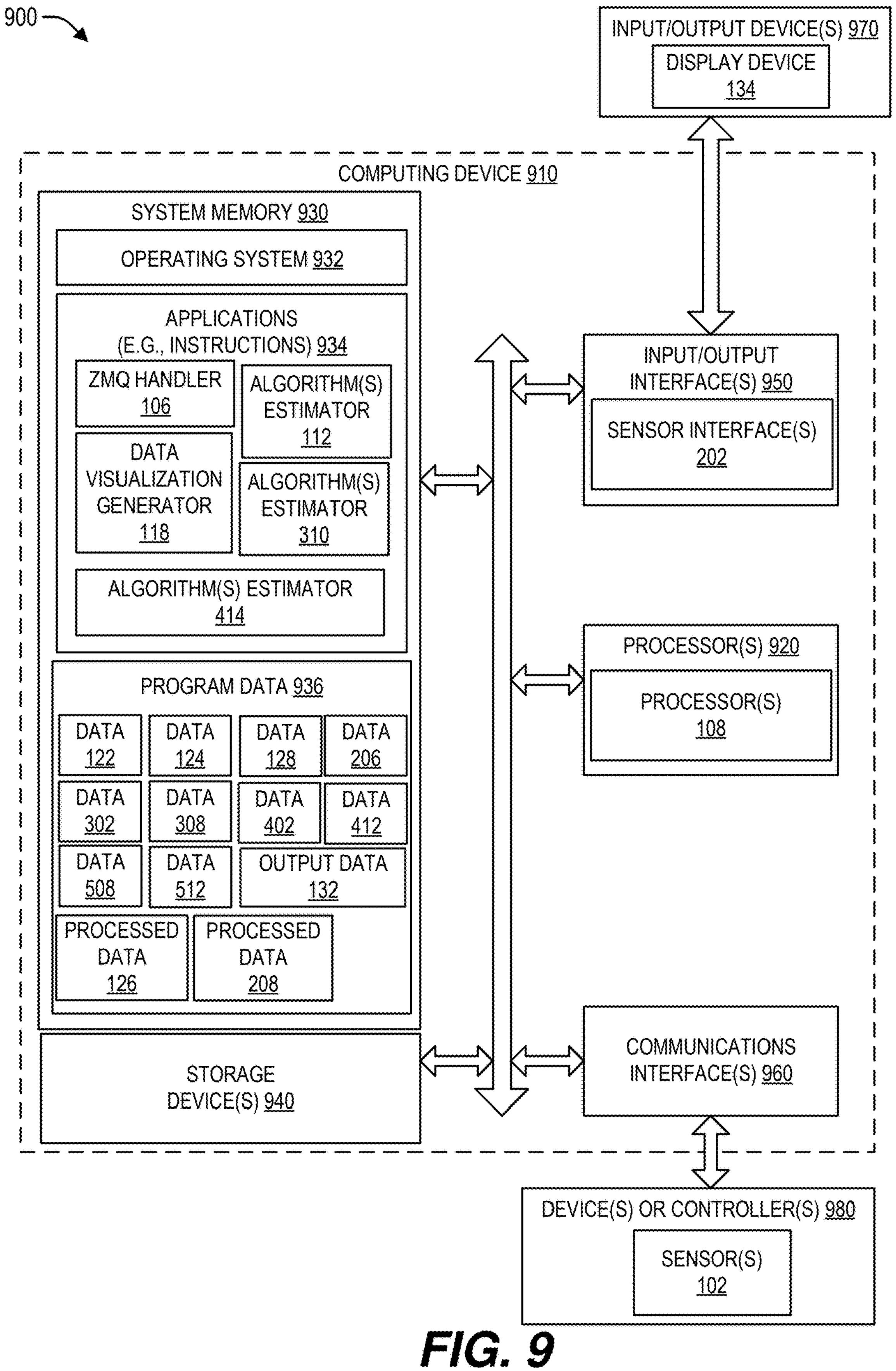
FIG. 9 is a diagram of electronic components of a pilot monitoring system.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 9 depicts a computing device 910 including one or more processors ("processor(s)" 920 in FIG. 9), which indicates that in some implementations the computing device 910 includes a single processor 920 and in other implementations the computing device 910 includes multiple processors 920. For ease of reference herein, such features are generally introduced as "one or more" features and are subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates an example pilot cognitive inference system 100. The cognitive inference system 100 includes one or more sensors 102, a device 104 coupled to the sensor(s) 102, and a display device 134. The device 104 includes processor(s) 108 coupled to a memory 110. The processor(s) 108 include an algorithm(s) estimator 112, aircraft state data generator 114, and data visualization generator 118. While the system 100 can be on a computing device located in an aircraft or on a distributed computing system with components both on and off the aircraft, the system may also be implemented on a different vehicle, such as an automobile, sea vessel, helicopter, train, and so forth.

The system 100 can be configured to use procedures to enhance its accuracy and reliability in determining pilot cognitive states. For example, the system 100 can be configured to use physiological baselining and calibration for environmental factors.

Physiological baselining can be utilized to reduce the impact of confounding variables and can account for physiological differences across pilots. This approach can help mitigate the effects of nervousness or stress induced by participating in a data collection event, by allowing the pilot a short duration of time to become acclimated to the test environment. Physiological data can be taken for a short duration while the pilot is in a state of rest; this can allow the system 100 to derive additional variables during data collection, representing the difference in the physiological data from baseline. For example, as will be explained in more detail below, the system 100 can be configured to leverage variables such as "heart_rate_difference", which represents the difference between the instantaneous heart rate and the average heart rate during baseline data collection. By using physiological baselining this can help minimize inter and intra pilot variation in the algorithms when predicting mental fatigue and cognitive workload by considering how the pilot's current physiology has deviated from their physiology at rest.

In addition to physiological baselining, the system 100 can be configured to employ calibration procedures to account for environmental factors, particularly the influence of lighting conditions on pupil diameter. Individual differences, such as age, can impact the pupillary response to variations in environmental lighting. To account for this, the system 100 can be configured to measure a subject's pupil diameter while they observe a screen with changing brightness levels. The resulting pairwise data, associating each brightness value with its corresponding pupil diameter measurement, can be used to fit a pupillary response curve specific to that individual pilot. As will be described in more detail below with regards to processing data related to eye tracking data (e.g., data 122A), this curve can be used during task execution to estimate the influence of dynamic ambient lighting conditions on that pilot's pupil diameter. This can enable the system 100 to differentiate between pupil size variations due to cognitive factors, such as mental workload, and those due to environmental lighting conditions, thereby increasing the robustness of the system's 100 algorithm(s) estimator 112.

The sensors 102 can include an eye tracker sensor 102A, an ambient light sensor 102B, a heart rate sensor 102C, an electrodermal activity sensor 102D, a microphone sensor 102E, or a combination thereof. While five sensors are depicted in FIG. 1, in other implementations a different number (e.g., two, three, four, or some other number) of sensors 102 can be used.

The eye tracker sensor 102A can be configured to monitor various aspects of the pilot's visual behavior. The eye tracker sensor 102A can be configured to measure gaze direction in three-dimensional space, enabling the device 104 to determine where the pilot is looking at any given moment. This enables the device 104 to determine which instruments or displays the pilot has observed. The eye tracker sensor 102A can also be configured to measure pupil diameter, which can be an indicator of cognitive workload or emotional state. In some aspects, the eye tracker sensor 102A can be configured to track head position and orientation, providing information about the pilot's posture and general attention direction. The eye tracker sensor 102A can be configured to detect and analyze saccades (rapid eye movements), fixations (periods when the eyes are relatively still), and blinks, all of which can provide insights into the pilot's attention patterns and fatigue levels.

The eye tracker sensor 102A can be configured to send data 122A (e.g., eye tracking data) to a processor 108 of the device 104. For example, the eye tracker sensor 102A can be configured to send the data 122A to an eye tracker processor 108A to analyze the pilot's visual attention patterns and determine various cognitive states. In some implementations, the eye tracker processor 108A can be configured to calculate metrics such as fixation duration, saccade frequency, and scan patterns across the cockpit instruments. These metrics help determine where the pilot is focusing their attention and how efficiently they are gathering visual information. For example, longer fixation durations on a particular instrument can indicate increased cognitive processing of that information, while frequent saccades between instruments can suggest high situational awareness or potentially information overload.

The sensor(s) 102 can also include one or more ambient light sensors 102B. The one or more ambient light sensors 102B can be configured to measure an illuminance of a cockpit environment. This information enables the device 104 to determine the impact of lighting conditions on pupil dilation, allowing for more accurate interpretation of the data 122A by distinguishing between pupil changes caused by cognitive factors and those caused by environmental lighting fluctuations. The one or more ambient light sensors 102B can be configured to send data 122B (e.g., ambient light data) to the processor 108. For example, the one or more ambient light sensors 102B can be configured to send the data 122B to an ambient light processor 108B. In some aspects, the system 100 can be configured to measure illuminance of a digital screen directly from the software. For example, the system 100 can access screen brightness settings or pixel intensity values from the display software, providing an additional source for the data 122B.

The heart rate sensor 102C can be configured to monitor the pilot's heart rate and heart rate variability. The heart rate sensor 102C can be configured to monitor the pilot continuously, at periodic intervals, or a combination thereof. These physiological signals can provide insights into the pilot's stress levels, workload, and overall physiological state. For example, changes in heart rate patterns can indicate increased cognitive load or the onset of fatigue, both of which can be factors in maintaining safe flight operations.

In some implementations, the heart rate sensor 102C can be a wearable device such as a wristband, ring, watch, and so forth. The heart rate sensor 102C can be configured to send data 122C (e.g., heart rate data) to the processor 108.

For example, the heart rate sensor 102C can be configured to send the data 122C to a heart rate processor 108C, which processes the data 122C to assess the pilot's stress levels and overall physiological arousal. In some aspects, the heart rate processor 108C analyzes heart rate variability (HRV) metrics, such as the standard deviation of normal-to-normal (NN) intervals (SDNN) and the root mean square of successive R wave interval differences (RMSSD). Lower HRV might indicate increased stress or mental workload, while changes in HRV patterns over time can signal the onset of fatigue. For example, a sustained decrease in SDNN during a complex flight maneuver could suggest elevated cognitive load, while a gradual reduction in RMSSD over a long flight might indicate increasing fatigue.

The electrodermal activity (EDA) sensor 102D can be configured to measure changes in the electrical properties of the pilot's skin. Specifically, the EDA sensor 102D can be configured to track skin conductance, which tends to increase during periods of stress or heightened cognitive activity.

The device 104 uses the data 122D (e.g., EDA data) to measure the pilot's physiological arousal and stress levels. In processing this data 122D, the device 104 can be configured to identify skin conductance responses (SCRs) and analyze their frequency and amplitude. Increased SCR activity can indicate heightened stress or cognitive load, particularly when correlated with specific events or tasks during the flight. For example, a sudden increase in SCR frequency and amplitude during an unexpected weather change could indicate elevated stress levels, while sustained high SCR activity during a complex approach procedure might suggest high cognitive load.

The EDA sensor 102D can be configured to send the data 122D (e.g., EDA data) to the sensor processor 108. For example, the EDA sensor 102D can be configured to send the data 122D to an EDA processor 108D, which performs these detailed analyses of SCRs to contribute to the overall assessment of the pilot's physiological arousal and stress levels, as described in more detail herein.

The microphone sensor 102E can be configured to capture data 122E (e.g., audio data) from the cockpit, particularly the pilot's speech. The microphone sensor 102E can be configured to capture various aspects of vocal patterns, including frequency, communication intervals, and response times.

The device 104 can be configured to process the data 122E to analyze the pilot's speech patterns in detail. The device 104 can be configured to examine features such as speech rate, pitch variation, and vocal tension. Changes in these parameters can indicate increased stress or cognitive load. For example, a higher pitch and faster speech rate might suggest elevated stress levels, while longer response times or increased pauses might indicate higher cognitive load or fatigue.

The microphone sensor 102E can be configured to send the data 122E (e.g., audio data) to the sensor processor 108. For example, the microphone sensor 102E can be configured to send the data 122E to a microphone processor 108E, which performs these detailed analyses of speech patterns to contribute to the overall assessment of the pilot's cognitive state and stress levels, as described in more detail herein.

The device 104, in some implementations, includes interfaces for each of the sensors 102 that preprocess the data 122 before sending it to their respective processors 108. These interfaces and the initial preprocessing will be discussed in further detail in FIG. 2.

The eye tracker processor 108A can be configured to analyze the data 122A from the eye tracker sensor 102A. The eye tracker processor 108A can be configured to determine fixation durations and frequencies, detect saccade patterns, and measure pupil diameter changes. The eye tracker processor 108A can be configured to calculate head position and orientation. In some aspects, the eye tracker processor 108A can be configured to compute metrics such as PERCLOS (percentage of eyelid closure) for fatigue detection and gaze entropy for assessing situational awareness.

The ambient light processor 108B can be configured to normalize and calibrate the light measurements from the data 122B, converting sensor readings into standardized units of illuminance. The ambient light processor 108B can be configured to detect changes in lighting conditions that can affect pupil dilation and apply smoothing algorithms to reduce noise in the data 122B.

The heart rate processor 108C can be configured to analyze the data 122C that includes cardiac signals from the heart rate sensor 102C. The heart rate processor 108C can be configured to calculate heart rate and heart rate variability (HRV). The heart rate processor 108C can be configured to compute metrics such as the standard deviation of NN intervals (SDNN) and the root mean square of successive R wave interval differences (RMSSD), which provide insights into the pilot's stress levels and autonomic nervous system activity.

The electrodermal activity (EDA) processor 108D can be configured to identify significant skin conductance responses (SCRs) from the data 122D. The EDA processor 108D can be configured to calculate an amplitude and frequency of these responses and derive overall measures of sympathetic nervous system arousal. The EDA processor 108D can be configured to separate the tonic (baseline) and phasic (rapid-changing) components of the data 122D, providing a nuanced view of the pilot's physiological arousal state.

The microphone processor 108E can be configured to analyze various aspects of the data 122E from the microphone sensor 102E. The microphone processor 108E can be configured to measure fundamental frequency (pitch), analyze spectral characteristics, and potentially apply speech recognition algorithms to the data 122E. The microphone processor 108E can be configured to calculate metrics like jitter and shimmer in the voice, which can be indicators of stress or fatigue. The microphone processor 108E can be configured to perform cepstral analysis to derive features like the cepstral peak prominence, which can be used to determine vocal fatigue.

After the data 122 has been processed by one or more of the individual processors 108, the resulting processed data 126A is then sent to one or more algorithm(s) estimator 112 and the memory 110 via a ZeroMQ (ZMQ) handler 106. This ensures that the algorithm(s) estimator 112 has access to the most current processed data 126A for real-time analysis, while also preserving the processed data 126A for later review, analysis, or potential reprocessing with improved algorithms.

The aircraft state data generator 114 can be configured to collect and compile various data points that represent the current status and performance of the aircraft to generate data 124. This includes, but is not limited to, altitude data, roll data, pitch data, yaw data, and airspeed data, or some combination thereof. The aircraft state data generator 114 continuously monitors these parameters, gathering real-time information about the aircraft's position, orientation, and movement in three-dimensional space. In some implementations, the aircraft state data generator 114 can be configured to collect data on engine performance, fuel levels, and other systems critical to flight operations.

In some implementations, the aircraft state data generator 114 can be configured to interface with various onboard systems and sensors to collect this data 124. The aircraft state data generator 114 can be configured to gather information from the aircraft's inertial measurement unit (IMU), altimeter, airspeed indicator, and other avionics systems. The aircraft state data generator 114 can be configured to handle different data formats and sampling rates from these various sources, consolidating them into a coherent data stream (e.g., the data 124). The aircraft state data generator 114 can be configured to send the data 124 to an aircraft state data processor 108F.

Figure 2:
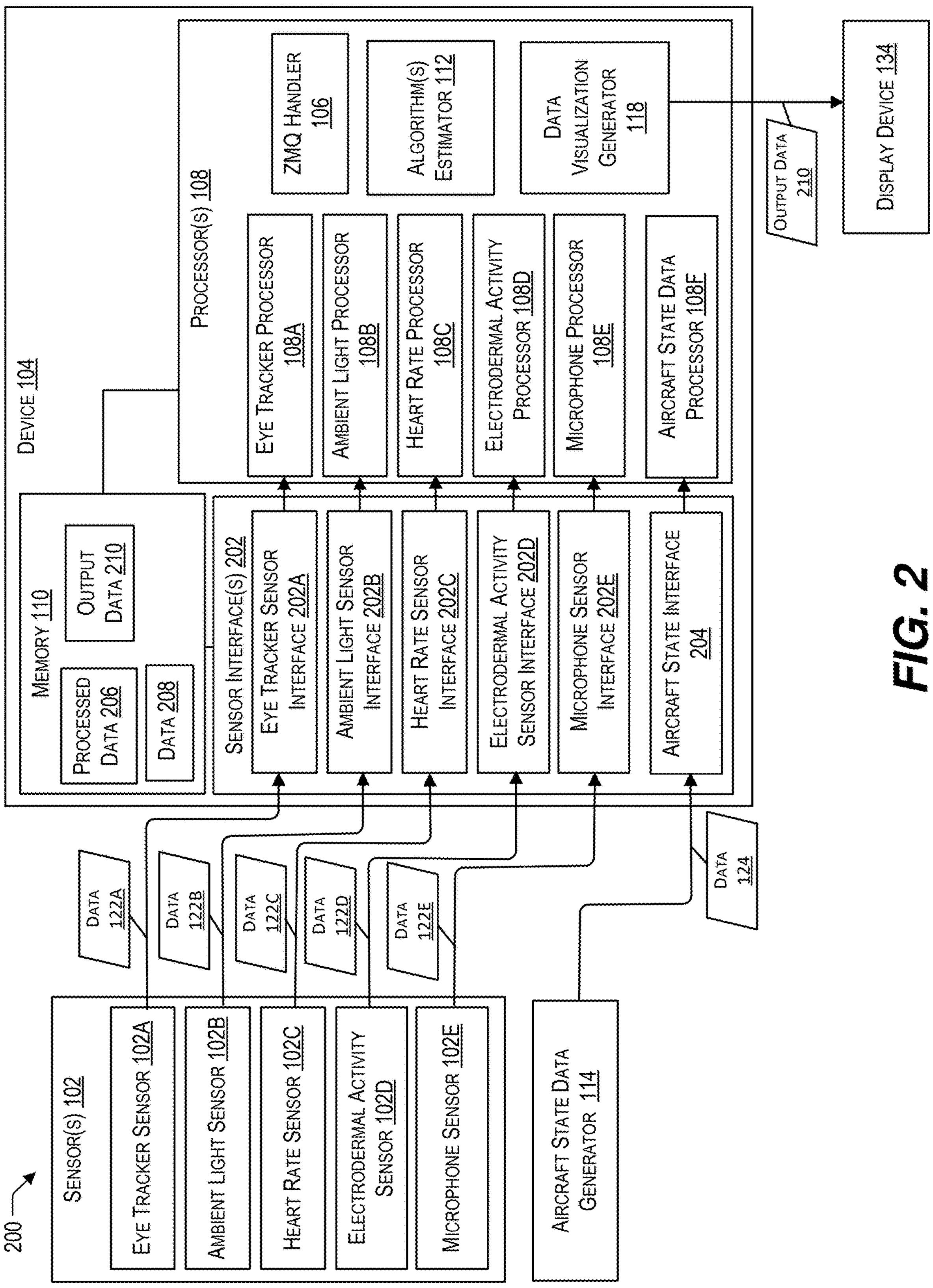
FIG. 2 is a particular implementation that illustrates the pilot cognitive inference system.

In some implementations, the device 104 includes a dedicated interface for the data 124, as is described in more detail in FIG. 2. The aircraft state data processor 108F can be configured to receive and the data 124 from the aircraft state data generator 114. The aircraft state data processor 108F can be configured to filter and smooth the data 124 to reduce noise and eliminate spurious readings. The aircraft state data processor 108F can be configured to employ various signal processing techniques such as moving averages, Kalman filters, or other algorithms to achieve this.

In some implementations, the aircraft state data processor 108F can be configured to calculate derived metrics that provide insights into the aircraft's behavior. For example, the aircraft state data process 108F can compute rate-of-climb or descent, turn rates, or acceleration in various axes. These derived metrics can offer information about the aircraft's dynamic state. The aircraft state data processor 108F can be configured to detect significant changes or anomalies in the aircraft's state. For example, identifying sudden altitude changes, unusual attitude angles, or unexpected variations in airspeed.

In some implementations, the aircraft state data processor 108F can be configured to contextualize the data 124 within the current phase of flight. It may work in conjunction with a Phase of Flight Forward Tracking (PFFT) algorithm or another algorithm to interpret the aircraft state data in the context of whether the aircraft is in takeoff, climb, cruise, descent, or landing phases. This contextualization helps in understanding whether the current aircraft state is normal or anomalous for the given flight phase.

Once the aircraft state data has been processed, the resulting processed data 126B is sent to both the algorithm(s) estimator 112 and the memory 110 via the ZMQ handler 106. This ensures that the processed data 126B is available for real-time analysis by the algorithm(s) estimator 112, while also being preserved in storage for later review, analysis, or potential reprocessing. This dual pathway allows for both immediate use of the processed data 126B in pilot monitoring and long-term storage for post-flight analysis or system 100 improvement.

The algorithm(s) estimator 112 can be configured to perform several functions once it receives the processed data 126. The algorithm(s) estimator 112 can be configured to integrate the diverse data streams to build a comprehensive picture of the pilot's cognitive state. For example, if the data 122A shows rapid scanning between instruments, the data 122C indicates elevated stress levels, and the data 122E suggests increased tension, the algorithm(s) estimator 112 can determine that the pilot is experiencing high mental workload and potentially approaching cognitive overload.

In some implementations, the algorithm(s) estimator 112 includes multiple Kalman filters and a Gaussian Mixture Model (GMM) algorithm. Each Kalman filter represents a different hypothesis about the pilot's cognitive state, accounting for individual variations in pilot responses. The GMM algorithm can be configured to combine the outputs from these multiple Kalman filters, allowing for a probabilistic representation of the pilot's cognitive state that captures both the most likely state and the uncertainty in the estimate.

The GMM algorithm can be configured to combine weighted outputs of the multiple Kalman filters. Each filter's output can be represented as a Gaussian component within a mixture, and the weights assigned to these components can be dynamically adjusted based on the data 122, 124 (e.g., physiological and aircraft state data). This dynamic weighting mechanism can enable the device 104 to adapt its estimates to the individual characteristics of the pilot being monitored and to changing flight conditions.

In some aspects, the data 122, 124 (e.g., physiological and aircraft state data) can be used to update both the individual Kalman filters and their respective weights in the GMM algorithm. This adaptive approach can enable the device 104 to provide a more accurate and nuanced estimation of the pilot's cognitive state over time, enhancing its ability to detect potential mode confusion or other cognitive issues that could affect flight safety.

The algorithm(s) estimator 112 can be configured to include a compound data fusion scheme. The compound data fusion scheme enables the algorithm(s) estimator 112 to include multiple interdependent estimation algorithms within the context of a Probabilistic Graphical Model (PGM) algorithm. This approach enables the algorithm(s) estimator 112 to leverage the strengths of different analytical techniques while maintaining a coherent probabilistic framework.

Within the Multi-Modal Cognitive State Estimation Framework, various machine learning models can be employed to process different aspects of the processed data 126. For example, a neural network can be used to classify eye movement patterns, while a Bayesian inference model algorithm could estimate fatigue levels based on the processed data 126 (e.g., physiological data). The outputs from each algorithm can be weighted according to their explanatory power for the given human state and fused into a single probabilistic estimate. The outputs of these individual models can then integrate within the PGM algorithm, which represents the relationships between different cognitive states and observable data as a graph structure.

The algorithm(s) estimator 112 can be configured to include a Phase of Flight Forward Tracking (PFFT) algorithm. The PFFT algorithm uses a Hidden Markov Model to calculate the probability of discrete flight phase states based on the processed data 126. It leverages learned likelihood models and known phase of flight dynamics to produce both maximum a posteriori estimates and categorical uncertainty values for the current phase of flight. By understanding the current flight phase, the algorithm(s) estimator 112 can be configured to contextualize the pilot's actions and attentional needs.

In some aspects, the algorithm(s) estimator 112 can be configured to include the PGM algorithm to track the pilot's current knowledge of various flight variables represented on instruments and gauges in the flight deck. The PGM algorithm can combine gaze tracking data (e.g., from the processed data 126) with a three-dimensional (3D) model of the environment to actively note the time since a given instrument has been looked at and any changes that have occurred within that time. The PGM algorithm can include a fully observable Recurrent Markov Chain to model the pilot's visual checking of instruments, with state progression denoting time since information internalization and resets occurring at stochastic intervals based on fixation duration. This enables the algorithm(s) estimator 112 to estimate the probability that the pilot is aware of the current state of each instrument, based on when they last looked at it and how the instrument's readings have changed since then.

The algorithm(s) estimator 112 can be configured to include a probabilistic perception estimation algorithm. This approach leverages the sequential nature of gaze data (e.g., processed data 126A) to create probabilistic perception estimates of discrete gaze events with quantified uncertainty. It can use weighted aggregation of raw gaze measurements over time windows, subdivided by saccades, to remove epistemic uncertainty and produce a 3D probabilistic view cone. This cone can then project onto a two-dimensional (2D) surface along with world model objects to calculate probabilistic object intersections.

The algorithm(s) estimator 112 can be configured to include a Multiple Model Cognitive State Estimator algorithm. The Multiple Model Cognitive State Estimator algorithm can provide cognitive state estimates for the pilot being monitored. The algorithm can begin with a set of pre-trained cognitive estimation models, each learned from historical data of various pilots using an Expectation Maximization model approach. These models can represent different patterns of how physiological signals relate to cognitive states. Each pre-trained model can be implemented as the measurement likelihood function in a separate Kalman filter, using a Nearly Constant Position dynamics model that assumes cognitive states change slowly over time unless perturbed by new observations.

In some implementations, as the Multiple Model Cognitive State Estimator algorithm receives new data (e.g., processed data 126) for the current pilot, it can run these multiple Kalman filters in parallel. The outputs of these parallel filters can then be combined using a dynamic weighting scheme, where weights can be calculated based on how well each model's predictions match the incoming data (e.g., processed data 126) from the current pilot. This enables the algorithm(s) estimator 112 to adapt its estimates to the individual characteristics of the pilot being monitored. The collection of weighted filter outputs is represented as a GMM algorithm, providing a probabilistic estimate of the pilot's cognitive state that captures both the most likely state and the uncertainty in the estimate.

Throughout the flight, as more data (e.g., processed data 126) is collected from the pilot, the weighting of different models can be continuously updated. This ongoing refinement enables the algorithm(s) estimator 112 to adapt its estimates over time, tailoring them to the specific patterns exhibited by the current pilot.

In some aspects, the algorithm(s) estimator 112 can be configured to compare the pilot's attention allocation with critical flight information. This comparison involves analyzing where the pilot is focusing their attention in relation to the most important instruments or displays for the current flight phase. For example, if the aircraft is approaching landing, the system 100 can be configured to assess whether the pilot is appropriately dividing their attention between the altimeter, airspeed indicator, and visual references outside the cockpit. Additionally, the algorithm(s) estimator 112 can be configured to determine altitude information that may be available from multiple sources, such as the primary flight display, a standby altimeter, and the radio altimeter. If the pilot has recently viewed any of these instruments, the algorithm9s) estimator 112 can be configured to determine a level of altitude awareness, even if the primary altimeter hasn't been directly observed. This analysis helps identify potential gaps in situational awareness that could impact flight safety.

The algorithm(s) estimator 112 can employ a combination of these algorithms in a modular and flexible manner to process the data 122, 124. Depending on a particular implementation and/or requirement(s), the algorithm(s) estimator 112 can include and use all of these algorithms in concert or select a subset of them. For example, the GMM algorithm can be configured to combine outputs from multiple Kalman filters, while the PFFT algorithm can be configured to provide context about the flight phase that can inform other algorithms'interpretations. The PGM algorithm can integrate outputs from various other algorithms to build a comprehensive model of the pilot's awareness. This modular approach can enable the system 100 to be adaptable to different scenarios and requirements.

After processing the data 126 using this flexible combination of algorithms, the algorithm(s) estimator 112 can be configured to generate data 128 and send the data 128 to a data visualization generator 118. The data visualization generator 118 can be configured to receive the data 128 from the algorithm(s) estimator 112 and generate output data 132 that includes dynamic, real-time visualizations providing intuitive insights into the pilot's cognitive states and situational awareness.

The data visualization generator 118 can be configured to create dynamic, graphical representations of the pilot's cognitive states and aircraft parameters. These visualizations can include color-coded gauges, trend lines, or other intuitive formats that display the pilot's available attentional resources, attention allocation, and situational awareness, alongside relevant aircraft state data. The output data 132 can be displayed, via a display device 134, in these various readable formats that allow for quick interpretation of the pilot's current cognitive condition in relation to the flight situation.

The data visualization generator 118 can be configured to generate the output data 132 to include a visualization of the probabilistic outputs of the Multiple Model Cognitive State Estimator algorithm. The visualization can represent the GMM algorithm as a probability distribution curve or as confidence intervals around point estimates, providing a visualization of both the estimated cognitive states and the associated uncertainties.

The data visualization generator 118 can be configured to generate the output data 132 to include visualizations related to the pilot's gaze behavior and situational awareness. The visualizations can include heat maps overlaid on a cockpit schematic to show where the pilot has been looking, or indicators of which instruments have been checked recently and which may need attention based on the Probabilistic Graphical Model algorithm's outputs.

The data visualization generator 118 can be configured to generate the output data 132 to include composite displays that integrate multiple data streams from the data 128. For example, the data visualization generator 118 can combine cognitive state estimates with gaze data (e.g., data 122A) and aircraft state information (e.g., data 124) to provide a comprehensive view of the pilot's current condition and awareness in relation to the flight situation.

The data visualization generator 118 can be configured to send the output data 132 to a display device 134 configured to display the output data 132. The display device 134 can include a screen in the cockpit, a tablet used by flight instructors, or any other suitable visual interface that allows for real-time monitoring of the pilot's cognitive states and situational awareness.

In some implementations, the data visualization generator 118 can be configured to send the output data 132 to the memory 110. This allows for the archiving of the output data 132 for post-flight analysis, training purposes, or long-term studies on pilot performance and cognitive patterns. By storing the output data 132, the system 100 enables more comprehensive retrospective analyses and continuous improvement of pilot training and support systems.

The ZeroMQ (ZMQ) handler 106 can be configured to serve as a central communication hub for the entire system 100, facilitating data flow between the sensors 102, various components within the device 104, and external systems.

When the system 100 initializes, the ZMQ handler 106 sets up a series of message queues corresponding to different data types and processing stages. The ZMQ handler 106 can be configured to create separate queues for the data 122, the processed data 126, the aircraft state data 124, the data 128, the output data 132, or a combination thereof.

The ZMQ handler 106 can be configured to interface directly with the sensor interfaces (e.g., sensor interfaces 202, as described in FIG. 2) for each sensor type in the sensors 102 array. As the sensors 102 collect data 122, their respective interfaces publish this data 122 to the appropriate queues. The ZMQ handler 106 can be configured to make this data 122 available to the corresponding processors 108.

Within the device 104, the ZMQ handler 106 can be configured to manage the flow of data 126, 128, 132, or a combination thereof, between the processors 108, the aircraft state data processor 108F, the algorithm(s) estimator 112, the data visualization generator 118, or a combination thereof. The ZMQ handler 106 enables these components to subscribe to relevant data streams and publish their outputs without needing to know the details of the overall system architecture.

For example, when the eye tracker processor 108A finishes processing the data 122A, it publishes the processed data 126A to a specific queue. The ZMQ handler 106 then ensures this processed data 126A is available to both the memory 110 for logging and the algorithm(s) estimator 112 for further analysis.

The ZMQ handler 106 is also configured to implement a logging system that subscribes to all data streams, allowing for comprehensive data capture and later replay. The ZMQ handler 106 can be configured to also provide error handling and system status monitoring. For example, if any component encounters an error or fails, the ZMQ handler 106 can publish this information to a dedicated error queue, enabling the system 100 to respond appropriately. While it is illustrated that the system 100 includes the ZMQ handler 106, other messaging protocols, such as Message Queuing Telemetry Transport (MQTT) or Advanced Message Queuing Protocol (AMQP), could be used.

By centralizing all inter-component communication through the ZMQ handler 106, the system 100 achieves a high degree of modularity. This design allows for easy addition or modification of components without needing to alter the entire system 100, as long as new components adhere to the established messaging protocols.

During operation, the sensors 102 continuously measure and collect data 122 (e.g., physiological data) from the pilot, including eye movements, heart rate, skin responses, audio, or a combination thereof. Concurrently, the aircraft state data generator 114 collects data 124 (e.g., flight data) on various flight parameters such as altitude, speed, and orientation. These data streams (e.g., data 122 and data 124) are then sent to their respective processors 108A-F. The processors 108 clean and extract relevant features from the data 122 (e.g., physiological data), while the aircraft state data processor 108F processes and contextualizes the data 124 (e.g., flight data).

The processed data 126A and 126B is then sent via the ZMQ handler 106 to both the memory 110 for archiving and to the algorithm(s) estimator 112. The algorithm(s) estimator 112, which includes one or more algorithms for human state estimation, pilot information tracking, and phase of flight tracking, analyzes the processed data 126 (e.g., incoming data streams). The algorithm(s) estimator 112 generates estimates of the pilot's cognitive states, including mental workload, fatigue, attention allocation, and situational awareness.

The algorithm(s) estimator 112 generates the data 128, which includes mental workload, fatigue, attention allocation, and situational awareness, or a combination thereof. The data 128 is then sent to the data visualization generator 118. The data visualization generator 118 takes the data 128 and transforms it into meaningful visual representations. The data visualization generator 118 creates dynamic, real-time visualizations that provide intuitive insights into the pilot's cognitive states and situational awareness, generating output data 132.

The output data 132 is sent to the display device 134, which presents the visualizations in a format easily interpretable by flight deck personnel, researchers, ground station operators, flight instructions, or a combination thereof. This could include color-coded gauges, trend lines, or other readable formats that allow for quick interpretation of the pilot's current cognitive condition and awareness of the aircraft state.

The technical advantages of using the system 100 includes providing a comprehensive, real-time assessment of pilot cognitive states and situational awareness, which was previously difficult to obtain non-invasively in operational settings. This can significantly enhance flight safety by detecting potential issues before they become critical. Another technical advantage includes the modular and flexible architecture of the system 100, which allows for easy integration of new sensors or algorithms, making the system 100 adaptable to future technological advancements or specific research needs. The use of the ZMQ handler 106 enables efficient, decoupled communication between components, which enhances system reliability and scalability.

Another technical advantage includes the system's 100 ability to process multiple data streams simultaneously and fuse them into meaningful insights. By combining physiological data with aircraft state information, the system 100 provides a more holistic view of the pilot's performance and awareness than traditional monitoring methods.

Another technical advantage includes the real-time visualization capabilities that make complex data easily interpretable, enabling quick decision-making by flight crew or researchers. This is particularly valuable in identifying and mitigating instances of mode confusion or other cognitive issues that might otherwise go unnoticed.

Another technical advantage includes the system's 100 data logging, replay capabilities, and reprocessing capabilities, which provide valuable tools for post-hoc analysis, training, and system improvement. This feature allows for detailed examination of pilot performance and system behavior, which can inform future training protocols and system enhancements. The reprocessing capabilities allow raw data to be passed back through the system using new or updated models to generate higher quality output. This means that as algorithms and models are refined over time, historical data can be reanalyzed to yield new insights or improved accuracy, maximizing the value of collected data and enabling continuous improvement of the system's performance.

Another technical advantage includes that the GMM enables the device 104 to represent complex, multi-modal probability distributions that can capture the nuances of different cognitive states. By using multiple Gaussian components, the GMM can represent multiple hypotheses about the pilot's state simultaneously, with the weights of these components reflecting the relative likelihood of each hypothesis. This approach is particularly useful in situations where the pilot's cognitive state can be ambiguous or rapidly changing. The GMM also provides a way to incorporate uncertainty into the estimates, which is important for making robust decisions based on these cognitive state assessments.

FIG. 2 is a diagram that illustrates another pilot cognitive inference system 200. The system includes the sensor(s) 102, the device 104, the ZMQ handler 106, the memory 110, the algorithm(s) estimator 112, the aircraft state data generator 114, the data visualization generator 118, the display device 134, and a sensor interface(s) 202. While the system 100 can be on a computing device located in an aircraft or on a distributed computing system with components both on and off the aircraft, the system may also be implemented on a different vehicle, such as an automobile, sea vessel, helicopter, train, and so forth.

As shown in FIG. 2, the device 104 includes a set of sensor interfaces 202 that interface with the various sensors 102. Specifically, the device 104 includes an eye tracker sensor interface 202A, an ambient light sensor interface 202B, a heart rate sensor interface 202C, an electrodermal activity sensor interface 202D, a microphone sensor interface 202E, or a combination thereof. These interfaces 202 are configured to preprocess the data 122 (e.g., raw data) from respective sensors 102 before passing it on to the processors 108. For example, the sensor interfaces 202 can be configured to perform one or more of: removing NAN (Not a Number) values, applying bandpass filtering to remove noise outside the frequency range of interest, rejecting outliers that could skew the analysis, performing linear interpolation of missing values, or a combination thereof.

The eye tracker sensor 102A can be configured to monitor various aspects of the pilot's visual behavior. As described in FIG. 1, it can be configured to measure gaze position in three-dimensional space, pupil diameter, head position and orientation, and detect saccades, fixations, and blinks. The eye tracker sensor 102A can be configured to send the data 122A to the eye tracker sensor interface 202A. The eye tracker sensor interface 202A can be configured to receive the data 122A and perform initial processing. The eye tracker sensor interface 202A can be configured to handle tasks such as noise reduction, blink detection, and conversion of raw sensor outputs into meaningful eye tracking parameters.

The one or more ambient light sensors 102B can be configured to measure the illuminance of the cockpit environment, as described in FIG. 1. The one or more ambient light sensors 102B can be configured to send the data 122B to the ambient light sensor interface 202B. The ambient light sensor interface 202B can be configured to process the raw light intensity readings, potentially converting them into standardized units of illuminance. The ambient light sensor interface 202B interface is also configured to apply calibration factors or smoothing algorithms to ensure consistent and accurate ambient light measurements.

The heart rate sensor 102C can be configured to continuously monitor the pilot's heart rate and heart rate variability, as detailed in FIG. 1. The heart rate sensor 102C can be configured to send the data 122C to the heart rate sensor interface 202C. The heart rate sensor interface 202C can be configured to process the raw cardiac signals. The heart rate sensor interface 202C can be configured to perform tasks such as R-peak detection, heart rate calculation, and initial heart rate variability computations. The heart rate sensor interface 202C is also configured to handle any necessary signal filtering or artifact removal.

The electrodermal activity sensor 102D can be configured to measure changes in the electrical properties of the pilot's skin, as explained in FIG. 1. The electrodermal activity sensor 102D can be configured to send data 122D to the electrodermal activity sensor interface 202D. The electrodermal activity sensor interface 202D can be configured to process the raw skin conductance signals. The electrodermal activity sensor interface 202D can be configured to perform initial feature extraction such as identifying skin conductance responses or computing tonic and phasic components of the EDA signal.

The microphone sensor 102E can be configured to capture audio data from the cockpit, particularly the pilot's speech, as described in FIG. 1. The microphone sensor 102E can be configured to send data 122E to the microphone sensor interface 202E. The microphone sensor interface 202E can be configured to perform initial audio processing tasks. The microphone sensor interface 202E can be configured to handle noise reduction, voice activity detection, audio feature extraction, or a combination thereof. The microphone sensor interface 202E is also configured to manage any necessary audio format conversions or sampling rate adjustments.

In addition to these sensor interfaces 202, the device 104 can include an aircraft state interface 204. The aircraft state interface 204 can be configured to receive and preprocess the data 124 from the aircraft state data generator 114, ensuring that the aircraft state information is in a suitable format for further processing.

The ZMQ handler 106 can be configured to manage the data flow between the sensor interfaces 202 and the processors 108. The ZMQ handler 106 can be configured to set up a publish-subscribe messaging pattern, where each sensor interface 202 acts as a publisher and the corresponding processor 108 acts as a subscriber. When a sensor interface 202 has data ready to send, the ZMQ handler 106 can be configured to publish the data to a specific topic. The ZMQ handler 106 is then configured to route these messages to the subscribed processors 108. This publish-subscribe system allows for decoupled, asynchronous communication. If a sensor 202 temporarily produces data 122 faster than it can be processed, the ZMQ handler 106 can be configured to buffer the messages. The ZMQ handler 106 is also configured to allow for easy addition of new data consumers, such as the memory 110, which can subscribe to all data topics to log raw data without affecting the main processing pipeline. While it is illustrated that the system 200 includes the ZMQ handler 106, other messaging protocols, such as Message Queuing Telemetry Transport (MQTT) or Advanced Message Queuing Protocol (AMQP), could be used.

This architecture, with the sensor interfaces 202, ZMQ handler 106, and processors 108, enables the system 200 to efficiently manage the flow of data from multiple, diverse sensors, each with its own data format and timing characteristics.

The eye tracker processor 108A can be configured to receive the preprocessed data (e.g., the data 122A processed by the eye tracker sensor interface 202A) and perform one or more algorithms to detect and classify different types of eye movements, such as smooth pursuits, microsaccades, and tremors. The eye tracker processor 108A can be configured to correlate eye movements with the 3D model of the cockpit environment, allowing it to determine precisely which instruments or displays the pilot is observing at a given moment. The eye tracker processor 108A can be configured to compute complex metrics such as scan paths, dwell times on specific areas of interest, and transitions between different cockpit regions.

The ambient light processor 108B can be configured to receive the preprocessed data (e.g., the data 122B processed by the ambient light sensor interface 202B) and perform one or more algorithms to track changes in lighting conditions over time, potentially identifying patterns related to different phases of flight or environmental conditions. The ambient light processor 108B can be configured to correlate light measurements with other data 122, such as pupil dilation from the eye tracker sensor 102A, to provide context for interpreting physiological responses.

The heart rate processor 108C can be configured to receive the data (e.g., the data 122C processed by the heart rate sensor interface 202C) and perform time-domain, frequency-domain, and non-linear analyses of heart rate variability. The heart rate processor 108C can be configured to compute metrics such as the power spectral density in different frequency bands, which can provide insights into the balance between sympathetic and parasympathetic nervous system activity.

The EDA processor 108D can be configured to receive the data (e.g., the data 122D processed by the EDA interface 202D) and perform signal processing techniques to separate the tonic and phasic components of the EDA signal. The EDA processor 108D can be configured to perform temporal analyses of SCRs, potentially identifying patterns or rhythms in sympathetic nervous system activation. The EDA processor 108D can be configured to correlate EDA responses with specific events or stimuli in the cockpit environment, providing a more contextualized understanding of the pilot's physiological arousal.

The microphone processor 108E can be configured to receive the data (e.g., the data 122E processed by the microphone sensor interface 202E) and perform speech recognition to transcribe the pilot's utterances. The microphone processor 108E can be configured to conduct sentiment analysis on the transcribed speech, potentially identifying emotional states from vocal cues. The microphone processor 108E can be configured to analyze non-speech vocalizations, such as sighs or cleared throats, which can provide additional insights into the pilot's cognitive state.

The aircraft state data processor 108F can be configured to receive the data (e.g., the data 124 processed by the aircraft state interface 204), process, and track a wide range of flight parameters, including but not limited to altitude, airspeed, vertical speed, heading, pitch, roll, yaw, engine performance metrics, and systems status indicators, as described in FIG. 1. The aircraft state data processor 108F can be configured to detect significant changes or anomalies in these parameters, potentially identifying unusual flight conditions or system malfunctions. The aircraft state data processor 108F can be configured to correlate the processed data received from the aircraft state interface 204 with the pilot's actions and physiological responses. The aircraft state data processor 108F can be configured to identify patterns that may indicate how different flight conditions affect the pilot's cognitive state. The aircraft state data processor 108F can be configured to implement predictive algorithms, anticipating future aircraft states based on current trends and pilot inputs. Such predictions could be crucial for early detection of potential issues or conflicts.

The processors 108, can be configured to send respective processed data 206 to the ZMQ handler 106. The ZMQ handler 106 can be configured to then route the processed data 206 to both the algorithm(s) estimator 112 and the memory 110. This ensures that the algorithm(s) estimator 112 have access to the most current, analyzed data for real-time cognitive state estimation, while also preserving the processed data 206 for later review, analysis, or potential reprocessing with improved algorithms. The algorithm(s) estimator 112 use the processed data 206 to determine mental workload and mental fatigue of the pilot based on the physiological data. For example, the algorithm(s) estimator 112 can analyze the processed data 206 (e.g., physiological data, such as heart rate variability, eye movement patterns, and potentially even vocal characteristics) to gauge the pilot's mental workload and fatigue levels. The algorithm(s) estimator 112 can employ machine learning models, as described in FIGS. 3 and 4, to identify patterns in the processed data 206 that correlate with these cognitive states.

The algorithm(s) estimator 112 can be configured to determine available attentional resources of the pilot based on the mental workload and mental fatigue. For example, based on the determined mental workload and fatigue, the algorithm(s) estimator 112 can calculate the pilot's available attentional resources. This represents the pilot's cognitive capacity to process information and respond to events at a given moment. The algorithm(s) estimator 112 can include a combination of rule-based logic and probabilistic models to infer this capacity from the workload and fatigue estimates.

The algorithm(s) estimator 112 can be configured to determine attention allocation of the pilot based on the available attentional resources and gaze patterns derived from the physiological data. For example, the algorithm(s) estimator 112 can utilize the available attentional resources in conjunction with gaze patterns (e.g., from the processed data 206) to determine the pilot's attention allocation. This process can involve assessing how the pilot is distributing their attention across various instruments, displays, and the external environment. The algorithm(s) estimator 112 can employ techniques such as probabilistic gaze intersection analysis, as described in FIG. 5, to track the pilot's visual focus and infer their attentional priorities.

The algorithm(s) estimator 112 can be configured to determine situational awareness of the pilot based on the attention allocation and the aircraft state data. For example, the algorithm(s) estimator 112 can be configured to integrate the pilot's attention allocation with real-time aircraft state data (e.g., data 124) to evaluate the pilot's situational awareness. This process can involve assessing whether the pilot is attending to the most critical information and instruments given the current flight phase and aircraft conditions. The algorithm(s) estimator 112 can utilize probabilistic models and contextual information about the flight to infer the pilot's comprehension of the overall situation.

The data visualization generator 118 receives the data 208 from the algorithm(s) estimator 112 and transforms it into one or more visual representations, as described in FIG. 1.

The data visualization generator 118 creates dynamic visualizations that provide intuitive insights into the pilot's cognitive states and situational awareness, generating output data 210. This output data 210 can include color-coded gauges, trend lines, or other readable formats that allow for quick interpretation of the pilot's current cognitive condition and awareness of the aircraft state. The data visualization generator 118 then sends the output data 210 to the display device 134, which presents these visualizations in a format easily interpretable by flight deck personnel or researchers.

The technical advantages of using the system 200 can include providing a comprehensive, multi-layered architecture for processing and analyzing diverse sensor data in real-time to infer pilot cognitive states. The use of dedicated sensor interfaces (202A-E) for each sensor type allows for optimized data acquisition and initial preprocessing tailored to each sensor's unique characteristics. This approach enhances data quality and reliability from the outset. The implementation of the ZMQ handler 106 as a central communication hub provides a flexible, scalable, and efficient means of data distribution throughout the system. This publish-subscribe model allows for easy integration of new components and ensures that all parts of the system have access to the most up-to-date information. The specialized processors (108A-E) and flight data processor 108F enable context-aware analysis of each data stream. This can allow for extraction of complex, high-level features from the sensor data 122, which enables the 200 to have accurate cognitive state estimation.

Another technical advantage of using the system 200 can include the system's 200 ability to correlate data across multiple sensors and the aircraft state, as processed by these components, enables a more holistic understanding of the pilot's cognitive state in relation to the flight environment and ongoing operations. Furthermore, the system 200 supports both real-time processing for immediate cognitive state estimation and data storage for post-hoc analysis and system improvement. This dual-purpose design enhances the system's 200 utility for both immediate safety applications and long-term research and development efforts.

Figure 3:
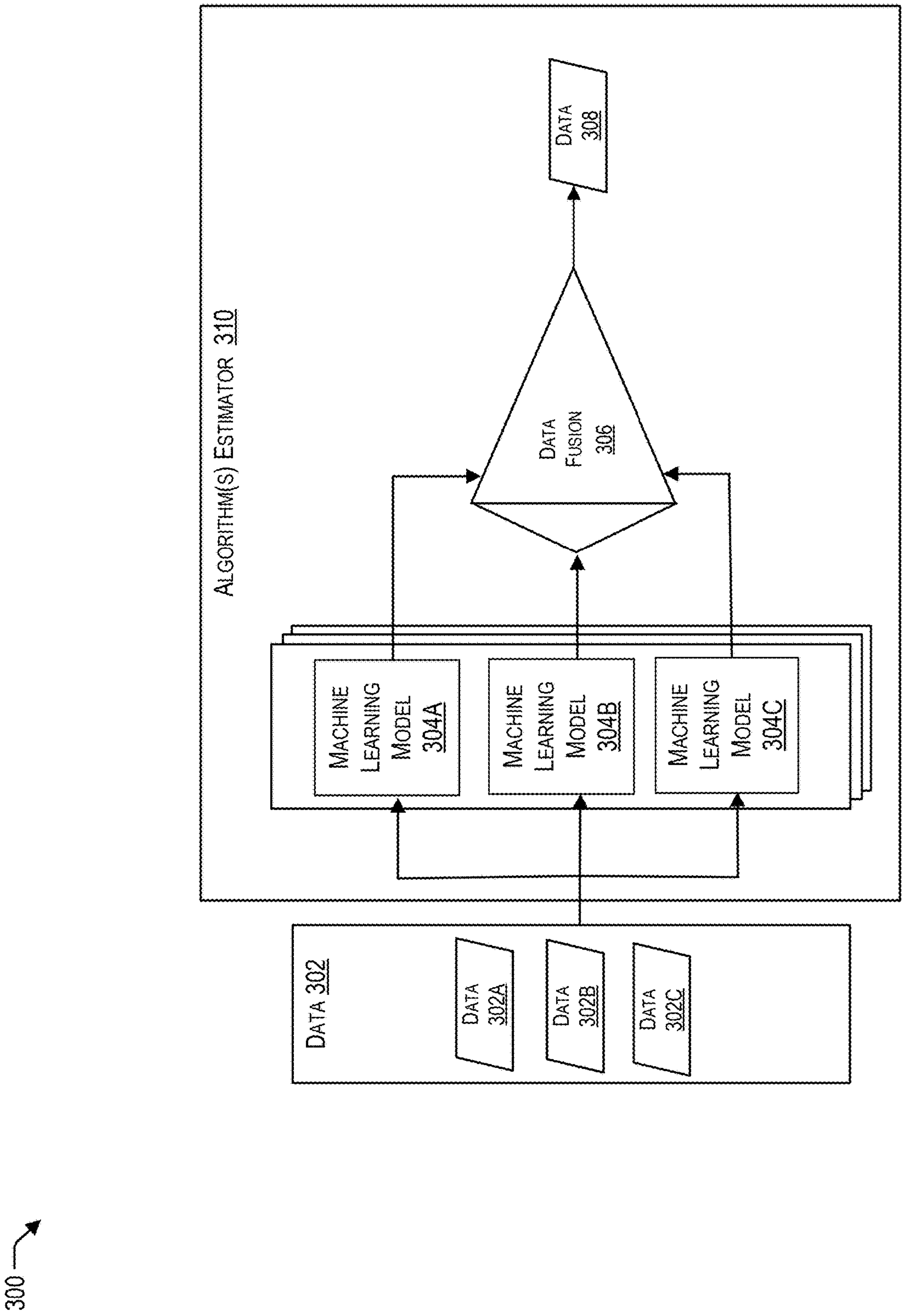
FIG. 3 is a particular implementation that illustrates an estimation algorithm using a Multi-Modal Cognitive State Estimation Framework.

FIG. 3 is a particular implementation 300 that illustrates an example of the algorithm(s) estimator 310 that includes a Multi-Modal Cognitive State Estimation Framework. The algorithm(s) estimator 310 can include the algorithm(s) estimator 112 as described in FIGS. 1 and 2.

The algorithm(s) estimator 310 can be configured to use one or more data 302 inputs. The data 302 can include data 302A, data 302B, and data 302C, each of which can represent various combinations of data types described in FIGS. 1 and 2. These data types include the data 122A-E, the aircraft state data 124, the processed physiological data 126, the processed sensor data 206, or any combination thereof. Each data (302A, 302B, 302C) input can contain different combinations of these data types, allowing for flexible and comprehensive analysis by the algorithm(s) estimator 310.

Each of the data 302 inputs is processed by a respective machine learning model 304. The first model, machine learning model 304A, can employ Bayesian inference techniques. Bayesian inference is a statistical method that updates the probability of a hypothesis as more evidence becomes available. In this context, it could be used to estimate the likelihood of various pilot states or conditions based on the data. For example, the machine learning model 304A can be configured to calculate the probability of pilot fatigue given observed physiological signals, flight duration, and time of day. The machine learning model 304A using the Bayesian inference methods can provide a technical advantage that it can handle uncertainty and incorporate prior knowledge about typical pilot behavior or physiological responses.

Machine learning model 304B can be configured to utilize a neural network architecture. Neural networks are inspired by the human brain and consist of interconnected nodes organized in layers. The machine learning model 304B can be configured to identify complex patterns in the data 302. For example, the machine learning model 304B can be trained to recognize patterns in pilot actions, eye movements, or physiological data that are indicative of certain cognitive states or levels of situational awareness.

Machine learning model 304C can be configured to use one or more regression models. The regression models can be configured to understand the relationships between variables and make predictions. For example, the regression models used by the machine learning model 304C can be used to predict continuous variables like stress levels, reaction times, or performance metrics based on various input factors. For instance, the machine learning model 304C can be configured to estimate a pilot's current level of mental workload based on factors such as flight phase, weather conditions, and recent aircraft system alerts. The machine learning model 304C can be configured to help quantify the impact of different factors on pilot performance and cognitive state.

The outputs from these machine learning models 304 can then be combined, via data fusion 306, and output as data 308. The data 308 can then be visualized by the data visualization generator 118 and displayed on the display device 134, as described in FIG. 1.

Using this integrated data 308, the algorithm(s) estimator 310 (e.g., Multi-Modal Cognitive State Estimation Framework) enables the device (e.g., device 104 of FIGS. 1-2) to determine the available attentional resources of the pilot based on the mental workload and mental fatigue. This assessment can be configured to combine outputs from the machine learning models 304 to estimate the pilot's current cognitive capacity. The algorithm(s) estimator 310 can be configured to then determine the attention allocation of the pilot. This process takes into account the previously calculated available attentional resources and incorporates gaze patterns derived from the data 302. The algorithm(s) estimator 310 can be configured to assess the pilot's situational awareness by combining the attention allocation data with the aircraft state data.

This multi-machine learning model 304 approach allows the algorithm(s) estimator 310 to provide a comprehensive assessment of the pilot's cognitive state and performance. By integrating diverse data sources (e.g., data 302A-C) and employing multi-machine learning models 304A-C, the algorithm(s) estimator 310 can be configured to provide insights that contribute to enhanced safety and efficiency in aviation operations.

In some implementations, the machine learning models 304A-C can be configured to use various types of algorithms. For example, the machine learning models 304A-C could employ decision trees, random forests, support vector machines, gradient boosting machines, or deep learning architectures such as convolutional neural networks (CNNs) or recurrent neural networks (RNNs). The choice of model for each input can be based on the characteristics of the data and the particular aspect of pilot cognitive state being estimated. In some aspects, the machine learning models 304A-C can be of the same type if desired, such as all being neural networks or all being regression models. Different models, even of the same type, can learn differently and provide varied outputs due to differences in their architecture, training data, or hyperparameters. This flexibility enables the system 300 to be optimized for different scenarios or types of data inputs.

Figure 4:
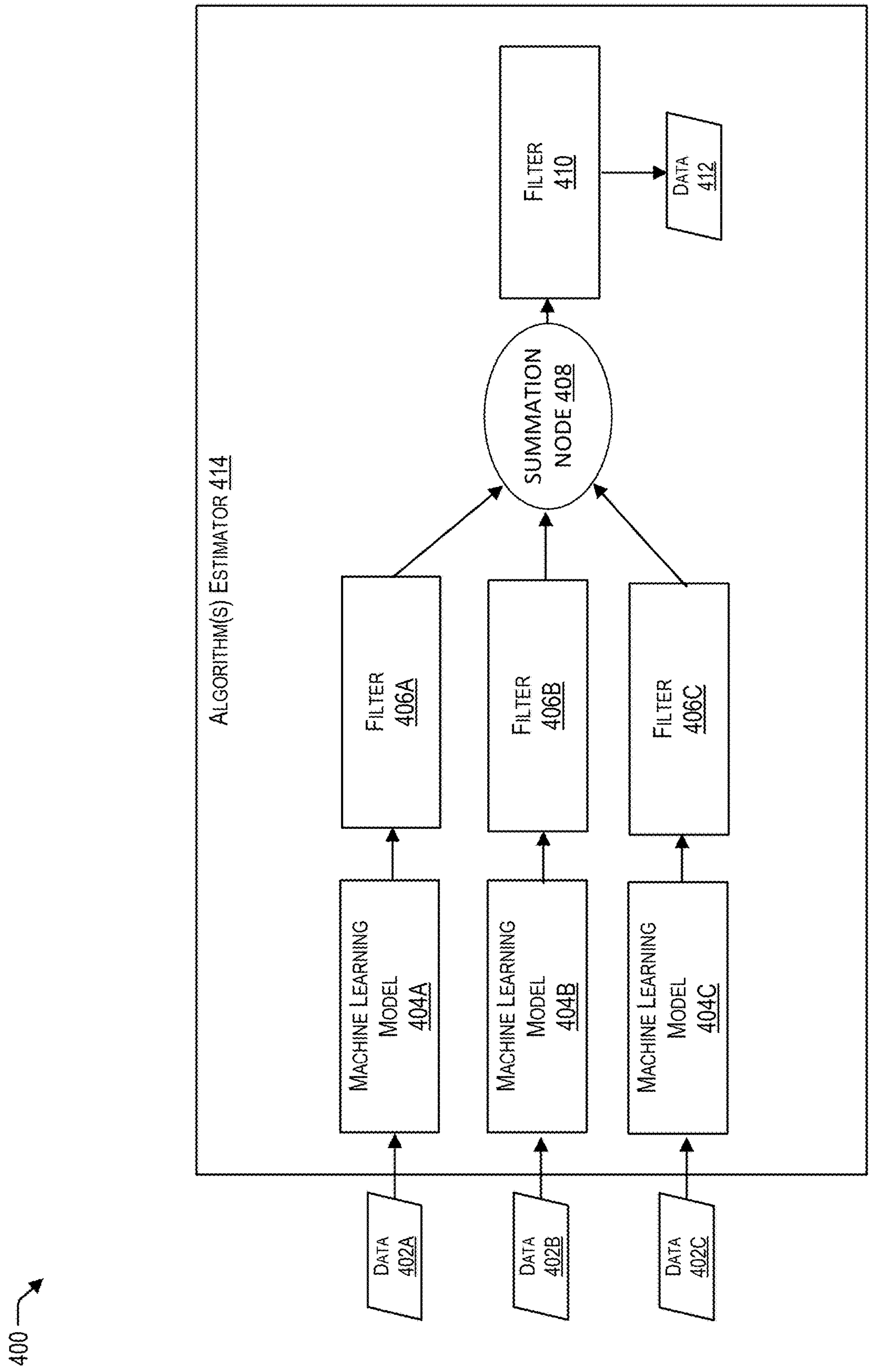
FIG. 4 is a diagram that illustrates a particular implementation of an estimation algorithm(s) using a Gaussian Mixture Model (GMM).

FIG. 4 is a diagram 400 that illustrates a particular implementation of the algorithm(s) estimator 414 that includes a Gaussian Mixture Model (GMM) algorithm. The algorithm(s) estimator 414 can be configured to process multiple streams of data to estimate various cognitive states of the pilot. The algorithm(s) estimator 414 can include the algorithm(s) estimator 112 as described in FIGS. 1 and 2, the algorithm(s) estimator 310 as described in FIG. 3, or a combination thereof.

The algorithm(s) estimator 414 can be configured to use one or more data 402 inputs. The data 402 can include data 402A, data 402B, and data 402C, each of which can represent various combinations of data types described in FIGS. 1 and 2. These data types include the data 122A-E, the aircraft state data 124, the processed physiological data 126, the processed sensor data 206, or any combination thereof. Each data (402A, 402B, 402C) input can contain different combinations of these data types, allowing for flexible and comprehensive analysis by the algorithm(s) estimator 414.

Each of the data 402 is processed by a separate machine learning model 404. For example, the data 402A is processed by machine learning model 404A, the data 402B is processed by machine learning model 404B, and the data 402C is processed by the machine learning model 404C. Each of these machine learning models 404 can be configured to implement an Expectation Maximization (EM) algorithm. In some implementations, the machine learning models 404 can be configured to use neural networks, support vector machines, random forests, gradient boosting machines, hidden Markov models, or a combination thereof, based on the specific characteristics of the data 402 and the desired outputs.

In some implementations, the machine learning models 404 can be configured to employ the EM algorithm for training. The EM algorithm can be an iterative method that enables the machine learning models 404 to learn the relationship between the data 402 (e.g., physiological signals, eye movements) and the corresponding cognitive states (e.g., workload, fatigue, attention). In some aspects, the EM algorithm can estimate the mean and covariance of Gaussian distributions that represent the likelihood of a particular cognitive state given the data 402. The EM algorithm can iteratively refine these estimates by computing the expected value of the log-likelihood function and maximizing it with respect to the mean and covariance. The EM algorithm can continue this process until the model(s) 404 converge to a maximum likelihood estimate of the mean and covariance, thereby enhancing the accuracy and reliability of the cognitive state estimation. The outputs of these machine learning models 404 can then be sent to filters 406A-C.

In some implementations, the machine learning models 404 can be configured to determine patterns and relationships within the data 402. Each machine learning model 404 can be configured to identify key features and map these features to cognitive state estimates. For example, the machine learning model 404A can be configured to estimate mental workload based on heart rate variability and eye movement patterns, while another machine learning model 404B can be configured to estimate fatigue based on blink rate and vocal characteristics.

The outputs of the machine learning models 404 can then be fed into filters 406A-C. These filters 406 can be configured to include Kalman filters. In some implementations, the filters 406 can be configured to include particle filters, unscented Kalman filters, extended Kalman filters, H-infinity filters, or a combination thereof.

Each of the filters 406 can be configured to refine and smooth the estimates produced by the machine learning models 404. The filters 406 can be configured to take into account the temporal aspects of the data, reducing noise and providing more stable estimates over time. For example, a filter 406 can be configured to smooth out rapid fluctuations in estimated workload that are likely due to measurement noise rather than actual changes in cognitive state.

The outputs of these individual filters 406 can then combined at a summation node 408. The summation node 408 can be configured to aggregate the estimates from the different data streams, potentially applying weights to prioritize certain estimates over others based on their reliability or relevance.

The aggregated estimates produced by the summation node 408 can be processed by a filter 410. The filter 410 can be configured to include a Gaussian Mixture Model (GMM) algorithm. The filter 410 can be configured to determine the uncertainty in the estimates and potentially represent multiple hypotheses about the pilot's cognitive state.

The output of the filter 410 can be represented as data 412, which can contain the final estimates of the pilot's cognitive states. The data 412 can then be visualized by the data visualization generator 118 and displayed on the display device 134, as described in FIG. 1.

During operation, the algorithm(s) estimator 414 can include a Gaussian Mixture Model (GMM) filter algorithm that can be configured to determine the available attentional resources of the pilot based on the mental workload and mental fatigue estimates. By combining estimates of workload and fatigue from the various data 402, the algorithm(s) estimator 414 can infer how many attentional resources the pilot has available at any given time. The algorithm(s) estimator 414 can be configured to determine the attention allocation of the pilot based on the available attentional resources and gaze patterns derived from the physiological data (e.g., data 402). By analyzing where the pilot is looking (from the data 402) in the context of their available attentional resources, the algorithm(s) estimator 414 can estimate how the pilot is distributing their attention across different instruments and areas of the cockpit. The algorithm(s) estimator 414 can be configured to determine the situational awareness of the pilot based on the attention allocation and the aircraft state data (e.g., data 402). By combining information (e.g., at summation node 408) about where the pilot is allocating their attention with data (e.g., the data 402) about the current state of the aircraft (such as altitude, speed, and system status), the algorithm(s) estimator 414 can estimate how aware the pilot is of the current situation.

Figure 5:
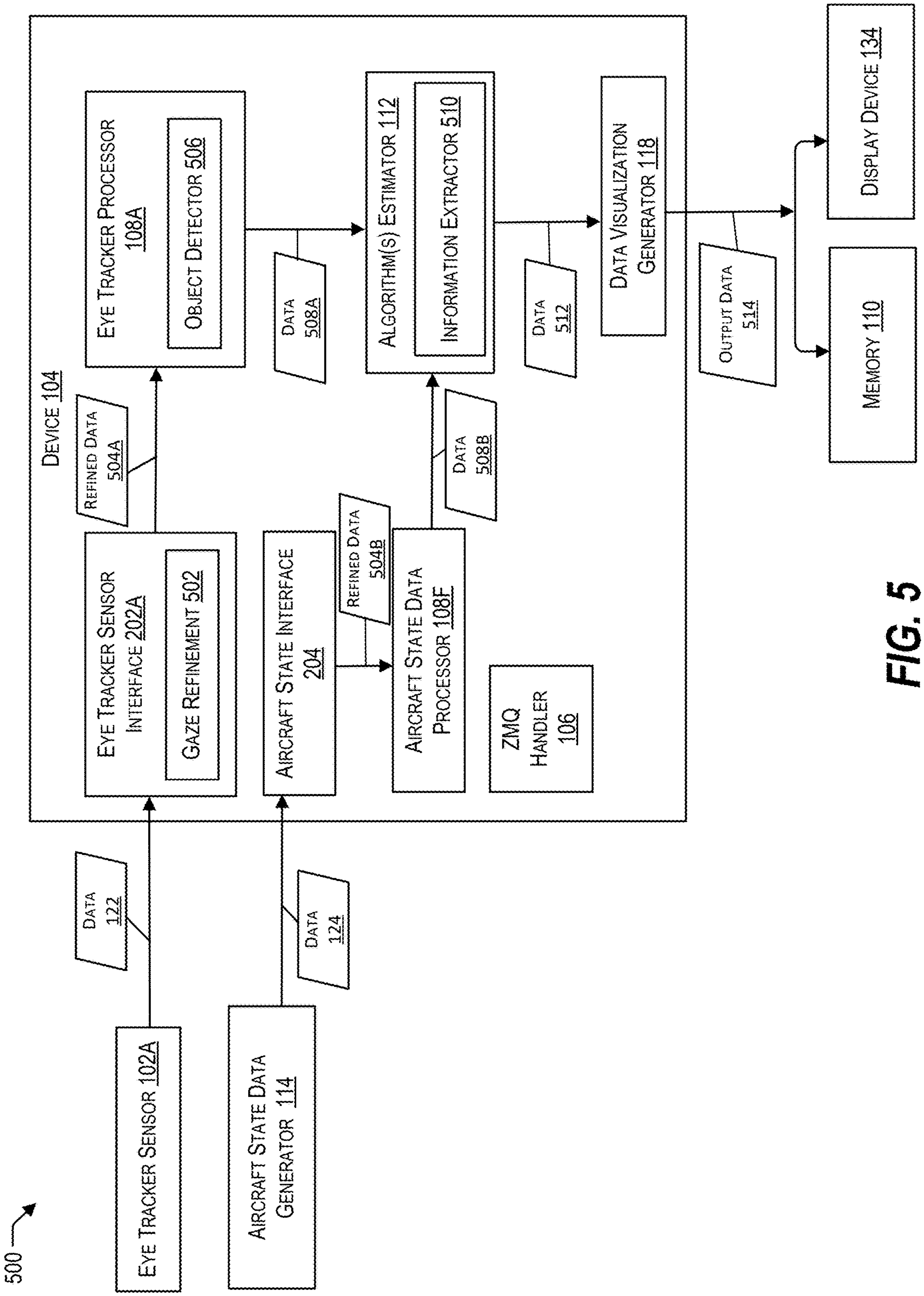
FIG. 5 is a diagram that illustrates a particular implementation of a pilot cognitive inference system, focusing on the processing of eye-tracking data and its integration with aircraft state data.

FIG. 5 is a diagram that illustrates a particular implementation of a pilot cognitive inference system 500, focusing on the processing of eye tracking data (e.g., the data 122) and its integration with aircraft state data (e.g., the data 124). The system 500 can include the eye tracker sensor 102A, which can be configured to capture raw gaze data (e.g., the data 122) from the pilot. As described in FIGS. 1 and 2, the eye tracker sensor 102A can be configured to measure gaze position in three-dimensional space, pupil diameter, eyelid opening, head position and orientation, and detect saccades, fixations, and blinks. The data 122 is sent to the device 104 for processing.

The device 104 can be configured to include the eye tracker sensor interface 202A that can be configured to the data 122. The eye tracker sensor interface 202A can include gaze refinement 502, which can be configured to perform initial preprocessing on the data 122. The gaze refinement 502 can be configured to filter noise, calibrate the gaze coordinates, and perform other low-level processing tasks. The gaze refinement 502 can be configured to separate the data 122 into windows of a predetermined length and further subdivided by saccade events. The gaze refinement 502 can be configured to apply a weighted average to the gaze origin and direction, using gaze quality as weights. The gaze refinement 502 generates refined data 504A, which includes a weighted mean of gaze origin and direction, along with a 3D uncertainty ellipsoid.

The refined data 504A is then sent to the eye tracker processor 108A. The eye tracker processor 108A can be configured to include an object detector 506 that can be configured to analyze the refined data 504A and determine which objects or areas of interest in the cockpit the pilot is looking at. The object detector 506 can be configured to implement a probabilistic approach, where a 3D probabilistic view cone is projected onto a 2D surface perpendicular to a gaze vector. The object detector 506 can be configured to enable a user to use either a size-based weighting scheme or object-importance weighting scheme. This flexibility enables the object detector 506 to adapt to different analysis priorities or cockpit configurations. The object detector 506 can be configured to calculate an overlap between the projected ellipse and the cockpit objects, using the selected weighting scheme, to determine a probability of gaze intersection with each object. The object detector generates data 508A, which includes probabilistic gaze intersection information.

The system 500 can include the aircraft state data generator 114 that can be configured to collect various flight parameters and system states, as described in FIGS. 1 and 2. The various flight parameters and system states are included in the data 124, which is sent to the aircraft state interface 204. The aircraft state interface 204 preprocesses the data 124, as described in FIG. 2, to generate refined data 504B and sends the refined data 504B to the aircraft state data processor 108F. The aircraft state data processor 108F processes the refined data 508B (e.g., as described in FIG. 1 with reference to the processed data 126B and as described in FIG. 2 with reference to the data 206), and then sends the data 508B to the algorithm(s) estimator 112.

The data 508A and the data 508B can then fed into the algorithm(s) estimator 112. The algorithm(s) estimator 112 can be configured to include an information extractor module 510. The information extractor module 510 can be configured to combine the data 508A with the data 508B to determine information about the pilot's perception and situational awareness. The information extractor module 510 can be configured to track when instruments were last viewed and how their values have changed since then. The information extractor module 510 can be configured to generate data 512, which represents a comprehensive probabilistic assessment of the pilot's Level 1 Situational Awareness—their perception of key elements in the environment. The data 512 can include information about what the pilot is currently looking at, and also a time-based record of what information they have recently acquired and how that information may have changed.

The data 512 from the algorithm(s) estimator 112 can then be sent to both the memory 110 and the data visualization generator 118. The memory 110 can be configured to archive the data 512 for later analysis or review. The data visualization generator 118 can be configured to generate output data 514 that can include a visual representations of the data 512, which are then displayed on the display device 134. Throughout this process, the ZMQ handler 106 can be configured to manage the flow of data between different components of the system, as described in FIGS. 1 and 2.

The technical advantages of using the system 500 includes a probabilistic analysis of the pilot's gaze behavior in the context of the current flight situation. By combining detailed eye tracking data with up-to-date aircraft state information, the system 500 is able to provide a nuanced, uncertainty-aware understanding of what the pilot is perceiving at a given moment.

Figure 6:
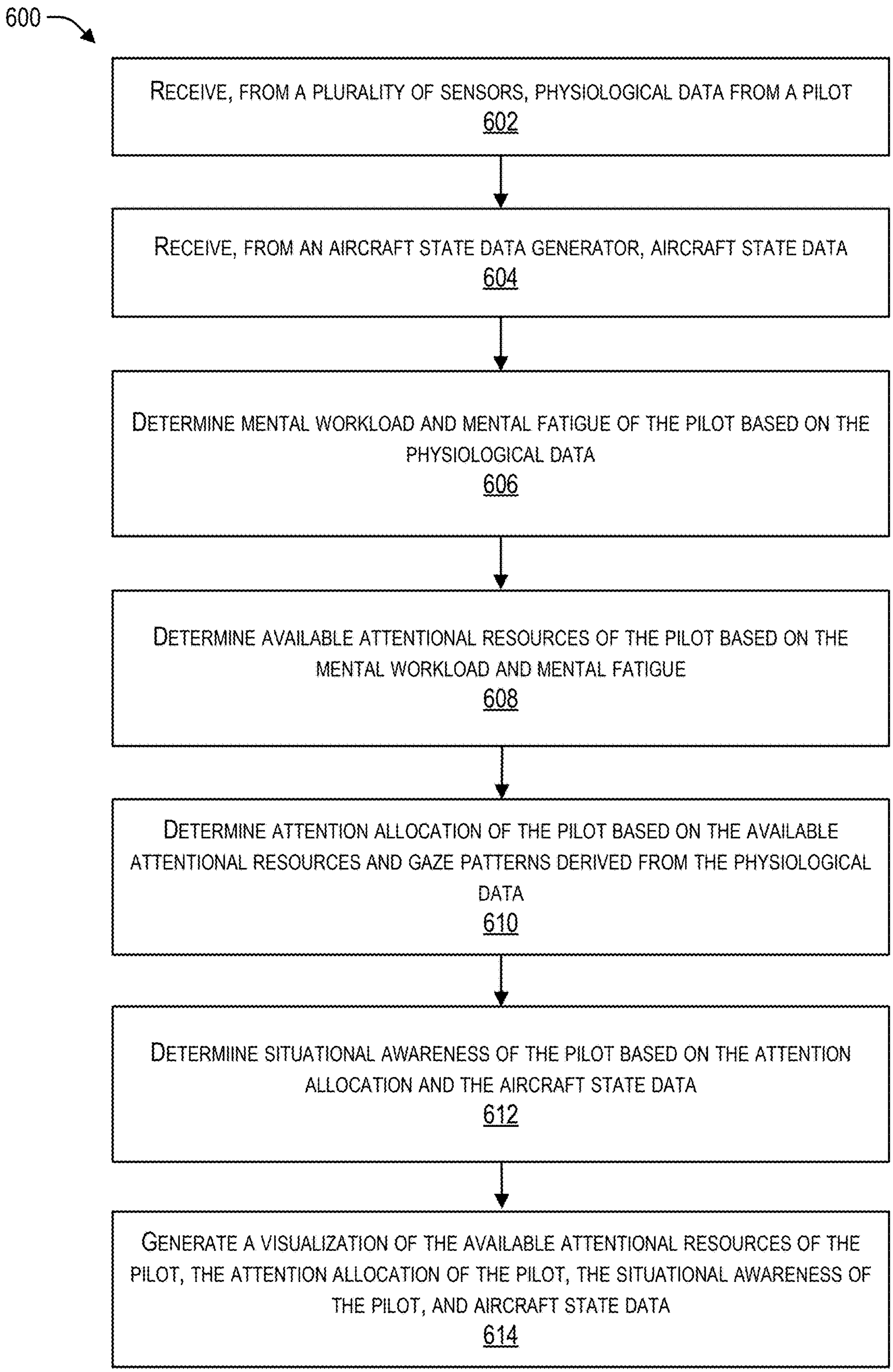
FIG. 6 is a flow chart of a method of use of a pilot monitoring system.

FIG. 6 is a flow chart of a method 600 of use of a pilot monitoring system. The method 600 includes, at block 602, receiving, from a plurality of sensors, physiological data from a pilot. For example, the system 100 of FIG. 1 can be configured to receive various types of data 122 from the sensors 102. The data 122 can include eye movement and pupil dilation data from the eye tracker sensor 102A, ambient light measurements from the ambient light sensor 102B, heart rate and heart rate variability data from the heart rate sensor 102C, skin conductance responses from the electrodermal activity sensor 102D, and vocal patterns and characteristics from the microphone sensor 102E.

The method 600 includes, at block 604, receiving, from an aircraft state data generator, aircraft state data. For example, the system 100 of FIG. 1 can be configured to receive various types of data 124 from the aircraft state data generator 114. The data 124 cab include information about the aircraft's position (altitude), orientation (roll, pitch, yaw), and movement (airspeed) in three-dimensional space. The system 100 can also receive data 124 that includes engine performance, fuel levels, and other critical flight systems.

The method 600 includes, at block 606, determining mental workload and mental fatigue of the pilot based on the physiological data. For example, the algorithm(s) estimator 112 of FIG. 1 can be configured to determine mental workload and mental fatigue of the pilot based on the physiological data. The algorithm(s) estimator 112 can be configured to integrate the diverse data streams to build a comprehensive picture of the pilot's cognitive state. For example, if the data 122A shows rapid scanning between instruments, the data 122C indicates elevated stress levels, and the data 122E suggests increased tension, the algorithm(s) estimator 112 can determine that the pilot is experiencing high mental workload and potentially approaching cognitive overload. The algorithm(s) estimator 112 can be configured to use a Multi-Modal Cognitive State Estimation Framework. The Multi-Modal Cognitive State Estimation Framework enables the algorithm(s) estimator 112 to use a compound data fusion scheme to estimate human cognitive states such as mental workload, fatigue, and attention. The Multi-Modal Cognitive State Estimation Framework combines multiple interdependent estimation algorithms within the context of a Probabilistic Graphical Model (PGM) algorithm. This approach enables the algorithm(s) estimator 112 to leverage the strengths of different analytical techniques while maintaining a coherent probabilistic framework.

The method 600 includes, at block 608, determining available attentional resources of the pilot based on the mental workload and mental fatigue. For example, the algorithm(s) estimator 112 of FIG. 1 processes the data 122 received from the sensors 102 to determine the pilot's mental workload and fatigue. Using these determinations, the algorithm(s) estimator can estimate the pilot's available attentional resources, providing an assessment of the pilot's current cognitive capacity.

The method 600 includes, at block 610, determining attention allocation of the pilot based on the available attentional resources and gaze patterns derived from the physiological data. For example, the algorithm(s) estimator 112 of FIG. 1 can use the previously calculated available attentional resources along with gaze patterns derived from the data 122A to determine how the pilot is allocating their attention.

The method 600 includes, at block 612, determining situational awareness of the pilot based on the attention allocation and the aircraft state data. For example, the algorithm(s) estimator 112 of FIG. 1 can be configured to assess the pilot's situational awareness by combining the attention allocation data with the aircraft state data.

The method 600 includes, at block 614, generating a visualization of the available attentional resources of the pilot, the attention allocation of the pilot, the situational awareness of the pilot, and aircraft state data. For example, the data visualization generator 118 of FIG. 1 can be configured to receive the data 128 from the algorithm(s) estimator 112 and generate output data 132 that includes dynamic, real-time visualizations providing intuitive insights into the pilot's cognitive states and situational awareness. The data visualization generator 118 can be configured to create dynamic, real-time graphical representations of the pilot's cognitive states and aircraft parameters. These visualizations can include color-coded gauges, trend lines, or other intuitive formats that display the pilot's available attentional resources, attention allocation, and situational awareness, alongside relevant aircraft state data. The output data 132 can be displayed, via a display device 134, in these various readable formats that allow for quick interpretation of the pilot's current cognitive condition in relation to the flight situation.

Figure 7:
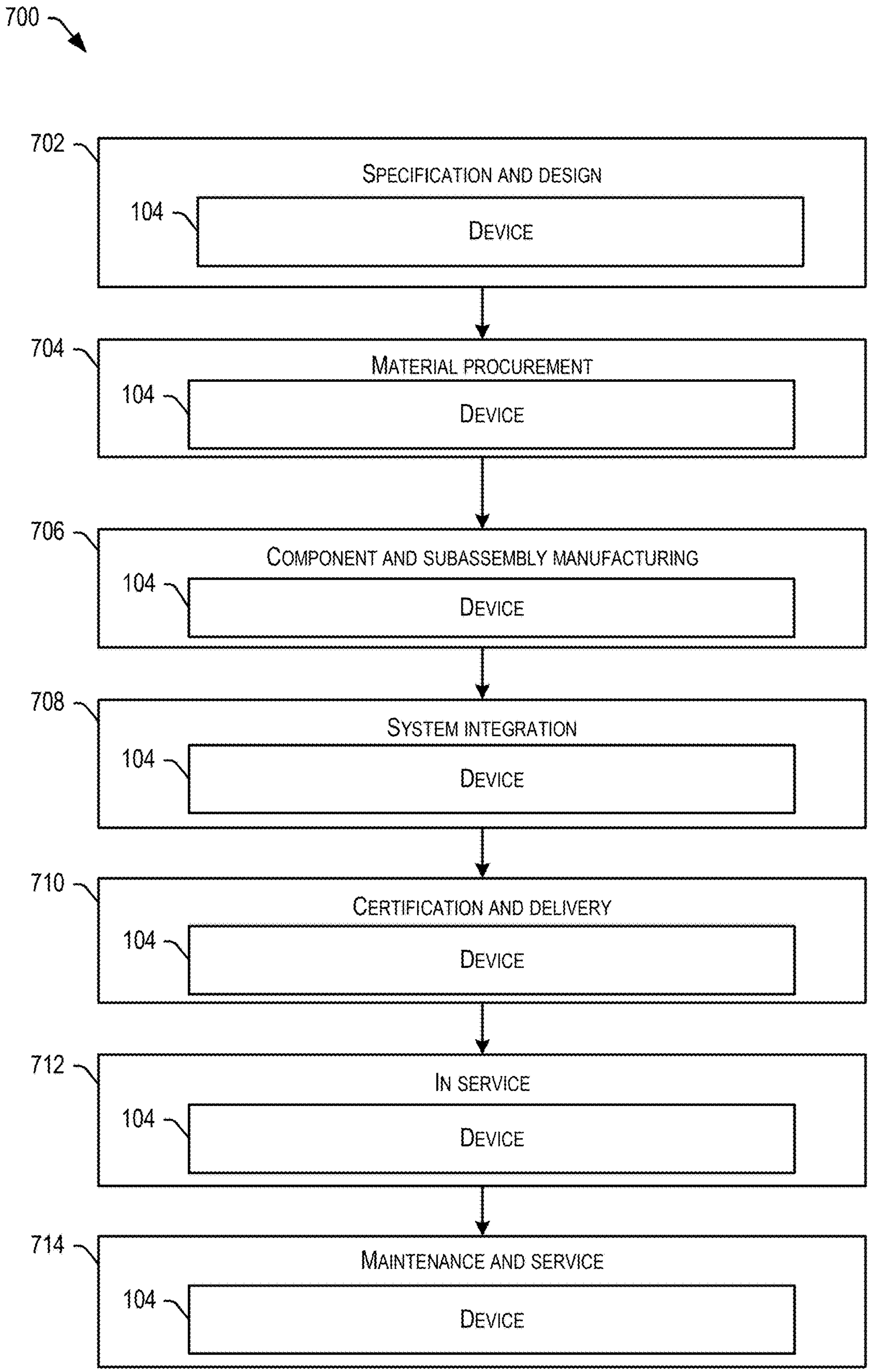
FIG. 7 is a flowchart illustrating an example of a life cycle of an aircraft that includes a pilot monitoring system.

FIG. 7 is a flowchart illustrating an example 700 of a life cycle of an aircraft that includes the pilot monitoring system 100, 200 of FIGS. 1 and 2. During pre-production, the exemplary method 700 includes, at block 702, specification and design of the aircraft. During specification and design of the aircraft, the method 700 may include specification and design of the device 104 and locations where the device 104 are to be placed. At block 704, the method 700 includes material procurement, which may include procuring materials for the device 104 or procuring a pre-assembled device 104.

During production, the method 700 includes, at block 706, component and subassembly manufacturing and, at block 708, system integration of the aircraft. For example, the method 700 may include component and subassembly manufacturing of the device 104, system integration of the device 104 with the aircraft, or both. At block 710, the method 700 includes certification and delivery of the aircraft and, at block 712, placing the aircraft in service. Certification and delivery may include certification of the device 104 to place the device 104 in service. While in service by a customer, the aircraft may be scheduled for routine maintenance and service (which may also include modification, reconfiguration, refurbishment, and so on). At block 714, the method 700 includes performing maintenance and service on the aircraft, which may include performing maintenance and service on the device 104. For example, the maintenance and service can include updating one or more algorithms used by the estimation algorithm, replacing one or more sensor interfaces 202, replacing one or more processors 108, or a combination thereof.

Each of the processes of the method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 8:
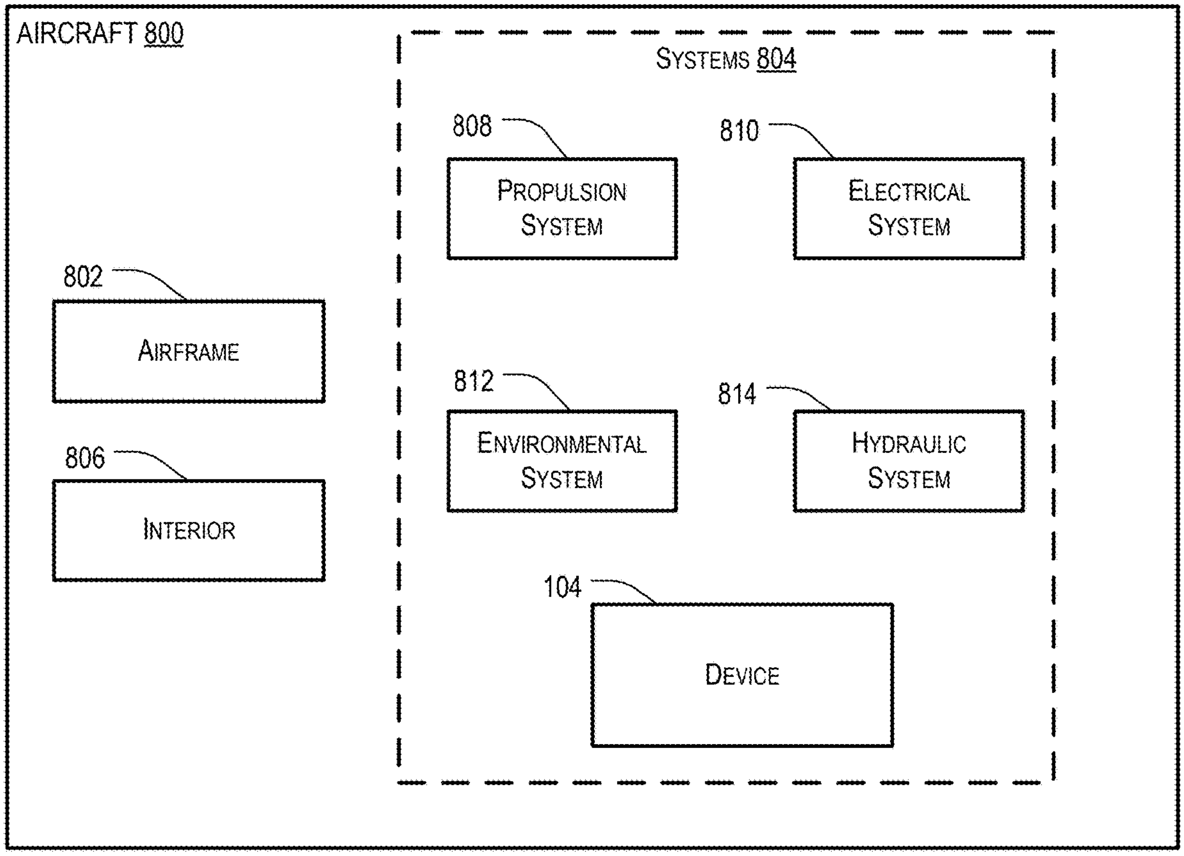
FIG. 8 is a block diagram illustrating aspects of an illustrative aircraft that includes a pilot monitoring system.

Aspects of the disclosure can be described in the context of an example of an aircraft 800 as shown in FIG. 8. In the example of FIG. 8, the aircraft 800 includes an airframe 802 with a plurality of systems 804 and an interior 806. Examples of the plurality of systems 804 include one or more of a propulsion system 808, an electrical system 810, an environmental system 812, a hydraulic system 814, and the device 104. Any number of other systems may be included. In the example of FIG. 8, the aircraft 800 includes the device 104 in accordance with one or more aspects of the disclosure as described in FIGS. 1-7. Portions of the device 104 are included in the airframe 802 and the interior 806. Also, the device 104 utilizes portions of the electrical system 810. For example, the device 104 may be powered by the electrical system 810.

FIG. 9 is a block diagram of a computing environment 900 including a computing device 910 configured to support aspects of computer-implemented methods and computer-executable program instructions (or code) according to the present disclosure. For example, the computing device 910, or portions thereof, can be configured to execute instructions to initiate, perform, or control one or more operations described with reference to FIGS. 1-8.

The computing device 910 includes one or more processors 920. In some aspects, the processor(s) 920 includes the processor(s) 108, as described in FIGS. 1-8. The processor(s) 920 are configured to communicate with system memory 930, one or more storage devices 940, one or more input/output interfaces 950, one or more communications interfaces 960, or any combination thereof. The system memory 930 includes volatile memory devices (e.g., random access memory (RAM) devices), nonvolatile memory devices (e.g., read-only memory (ROM) devices, programmable read-only memory, and flash memory), or both. The system memory 930 stores an operating system 932, which may include a basic input/output system for booting the computing device 910 as well as a full operating system to enable the computing device 910 to interact with users, other programs, and other devices. The system memory 930 stores system (program) data 936, such as the data 122, the data 124, the data 128, the data 206, the data 302, the data 308, the data 402, the data 412, the data 508, the data 512, the processed data 126, the processed data 208, the refined data 504, the output data 132, the output data 210, the output data 514, or a combination thereof.

The system memory 930 includes one or more operating systems 932 and/or one or more applications 934 (e.g., sets of instructions) executable by the processor(s) 920. As an example, the one or more applications 934 include instructions executable by the processor(s) 920 to initiate, control, or perform one or more operations described with reference to FIGS. 1-8, such as determining mental workload and mental fatigue of a pilot based on physiological data, determining available attentional resources of the pilot based on the mental workload and the mental fatigue, determining attention allocation of the pilot based on the available attentional resources and gaze patterns derived from the physiological data, determining situational awareness of the pilot based on the attention allocation and flight data, and generating a visualization of the available attentional resources of the pilot, the attention allocation of the pilot, the situational awareness of the pilot, and aircraft state data.

In a particular implementation, the system memory 930 includes a non-transitory, computer-readable medium storing the instructions that, when executed by the processor(s) 920, cause the processor(s) 920 to initiate, perform, or control operations to aid in design of an object. The operations include determining mental workload and mental fatigue of a pilot based on physiological data, determining available attentional resources of the pilot based on the mental workload and the mental fatigue, determining attention allocation of the pilot based on the available attentional resources and gaze patterns derived from the physiological data, determining situational awareness of the pilot based on the attention allocation and flight data, and generating a visualization of the available attentional resources of the pilot, the attention allocation of the pilot, the situational awareness of the pilot, and aircraft state data.

The one or more storage devices 940 include nonvolatile storage devices, such as magnetic disks, optical disks, or flash memory devices. In a particular example, the storage devices 940 include both removable and non-removable memory devices. The storage devices 940 are configured to store an operating system, images of operating systems, applications (e.g., one or more of the applications 934), and program data (e.g., the program data 936). In a particular aspect, the system memory 930, the storage devices 940, or both, include tangible computer-readable media. In a particular aspect, one or more of the storage devices 940 are external to the computing device 910.

The one or more input/output interfaces 950 enable the computing device 910 to communicate with one or more input/output devices 970 to facilitate user interaction. For example, the one or more input/output interfaces 950 can include the sensor interface(s) 202, a display interface, an input interface, or both. For example, the input/output interface 950 is adapted to receive input from a user, to receive input from another computing device, or a combination thereof. In some implementations, the input/output interface 950 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 970 includes one or more user interface devices and displays, including some combination of buttons, keyboards, pointing devices, displays, speakers, microphones, touch screens, and other devices.

The processor(s) 920 are configured to communicate with devices or controllers 980 via the one or more communications interfaces 960. For example, the one or more communications interfaces 960 can include a network interface. In another example, the one or more devices or controllers 980 includes the sensor(s) 102.

In some implementations, a non-transitory, computer-readable medium stores instructions that, when executed by one or more processors, cause the one or more processors to initiate, perform, or control operations to perform part or all of the functionality described above. For example, the instructions may be executable to implement one or more of the operations or methods of FIGS. 1-6. In some implementations, part, or all of one or more of the operations or methods of FIGS. 1-6 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, a system for determining pilot cognitive states, includes one or more processors coupled to a memory configured to receive physiological data and aircraft state data; determine mental workload and mental fatigue of a pilot based on the physiological data; determine available attention resources of the pilot based on the mental workload and mental fatigue; determine attention allocation of the pilot based on the available attention resources and gaze patterns derived from the physiological data; determine situational awareness of the pilot based on the attention allocation and the aircraft state data; and generate a visualization of the available attentional resources of the pilot, the attention allocation of the pilot, the situational awareness of the pilot, and aircraft state data.

Example 2 includes the system of Example 1, further including a plurality of sensors configured to collect the physiological data from a pilot, wherein the plurality of sensors includes one or more of: an eye tracker, an ambient light sensor, or a heart rate monitor.

Example 3 includes the system of Example 1 or Example 2, wherein the determination of the mental workload and the mental fatigue uses a Gaussian Mixture Model (GMM) to combine outputs from multiple Kalman filters, each filter representing a different hypothesis about a pilot's cognitive state.

Example 4 includes the system of Example 3, wherein the GMM is configured to combine weighted outputs of multiple Kalman filters, with each filter's weight dynamically adjusting based on the physiological and the aircraft state data.

Example 5 includes the system of any of Examples 1 to 5, wherein the one or more processors are further configured to track a pilot's current knowledge of flight variables using a Probabilistic Graphical Model (PGM) algorithm.

Example 6 includes the system of Examples 5, wherein the PGM algorithm models a pilot's decision to visually check an instrument as an event in a fully observable Recurrent Markov Chain.

Example 7 includes the system of any of Examples 1 to 6, wherein the visualization includes real-time updates of the mental workload and mental fatigue of the pilot, available attentional resources of the pilot, the attention allocation of the pilot, the situational awareness of the pilot and relevant aircraft parameters associated with the aircraft state data.

Example 8 includes the system of any of Examples 1 to 7, wherein the one or more processors are configured to determine the situational awareness including comparing the pilot's attention allocation with critical flight information.

According to Example 9, a method for determining pilot cognitive states, includes receiving, from a plurality of sensors, physiological data from a pilot; receiving, from an aircraft state data generator, aircraft state data; determining mental workload and mental fatigue of the pilot based on the physiological data; determining available attentional resources of the pilot based on the mental workload and mental fatigue; determining attention allocation of the pilot based on the available attentional resources and gaze patterns derived from the physiological data; determining situational awareness of the pilot based on the attention allocation and the aircraft state data; and generating a visualization of the available attentional resources of the pilot, the attention allocation of the pilot, the situational awareness of the pilot, and aircraft state data.

Example 10 includes the method of Example 9, further includes preprocessing the physiological data by performing one or more of: removing NAN values, applying bandpass filtering, rejecting outliers, or performing linear interpolation of missing values.

Example 11 includes the method of Example 9 or Example 10, wherein determining the mental workload and mental fatigue includes: tracking, using multiple Kalman filters, different hypotheses about the pilot's cognitive state to generate one or more outputs; combining the one or more outputs of these Kalman filters using a Gaussian Mixture Model (GMM), wherein each Kalman filter's output is represented as a Gaussian component; and dynamically adjusting one or more weights of the Gaussian component based on the physiological data and aircraft state data.

Example 12 includes the method of any of Examples 9 to 11, and further includes tracking a pilot's current knowledge of flight variables using a Probabilistic Graphical Model (PGM) algorithm.

Example 13 includes the method of Example 12, wherein the PGM algorithm includes modeling a pilot's decision to visually check an instrument as an event in a fully observable Recurrent Markov Chain.

Example 14 includes the method of any of Examples 9 to 13, wherein generating the visualization includes generating real-time graphical representations of the available attentional resources of the pilot, the attention allocation of the pilot, the situational awareness of the pilot and relevant aircraft parameters associated with the aircraft state data.

Example 15 includes the method of any of Examples 9 to 14, wherein determining the situational awareness includes comparing the pilot's attention allocation with critical flight information.

According to Example 16, a non-transitory computer-readable medium storing instructions that, when executed by one or more processors, cause the one or more processors to determine mental workload and mental fatigue of a pilot based on physiological data; determine available attentional resources of the pilot based on the mental workload and the mental fatigue; determine attention allocation of the pilot based on the available attentional resources and gaze patterns derived from the physiological data; determine situational awareness of the pilot based on the attention allocation and flight data; and generate a visualization of the available attentional resources of the pilot, the attention allocation of the pilot, the situational awareness of the pilot, and aircraft state data.

Example 17 includes the non-transient, computer-readable medium of Example 16, wherein the one or more processors are configured to estimate, using at least one Kalman filter, the pilot's mental workload and mental fatigue; combine, using a Gaussian Mixture Model (GMM), outputs of the at least on Kalman filter, wherein the output represents a weighted Gaussian component; and adapt a weight of the Gaussian component in real-time based on the physiological data and aircraft state data.

Example 18 includes the non-transient, computer-readable medium of Example 16 or Example 17, wherein the one or more processors are configured to implement a Probabilistic Graphical Model (PGM) algorithm to track a pilot's current knowledge of flight variables.

Example 19 includes the non-transient, computer-readable medium of any of Examples 16 to 18, wherein the one or more processors are configured to provide real-time graphical representations of the available attentional resources of the pilot, the attention allocation of the pilot, the situational awareness of the pilot and relevant aircraft parameters associated with the aircraft state data.

Example 20 includes the non-transient, computer-readable medium of any of Examples 16 to 19, wherein the one or more processors are configured to determine the situational awareness including comparing the pilot's attention allocation with critical flight information.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system for determining pilot cognitive states, comprising:

one or more processors coupled to a memory configured to:

receive physiological data and aircraft state data;

determine a cognitive state of a pilot based on the physiological data using a Gaussian Mixture Model (GMM) that combines outputs from a plurality of Kalman filters, wherein each Kalman filter of the plurality of Kalman filters represents a different hypothesis about the cognitive state of the pilot;

determine available attentional resources of the pilot based on the cognitive state;

determine attention allocation of the pilot based on the available attentional resources and gaze patterns derived from the physiological data;

determine situational awareness of the pilot based on the attention allocation and the aircraft state data; and generate a visualization of the available attentional resources of the pilot, the attention allocation of the pilot, the situational awareness of the pilot, and aircraft state data.

2. The system of claim 1, further comprising a plurality of sensors configured to collect the physiological data from a pilot, wherein the plurality of sensors includes one or more of:

an eye tracker, an ambient light sensor, or a heart rate monitor.

3. The system of claim 1, wherein the GMM is configured to combine weighted outputs of the plurality of Kalman filters, with each filter's weight dynamically adjusting based on the physiological data and the aircraft state data.

4. The system of claim 3, wherein each Kalman filter of the plurality of Kalman filters implements a pre-trained cognitive estimation model as a measurement likelihood function, wherein each pre-trained cognitive estimation model is learned from historical physiological data of a plurality of pilots.

5. The system of claim 1, wherein the one or more processors are further configured to track a pilot's current knowledge of flight variables using a Probabilistic Graphical Model (PGM) algorithm.

6. The system of claim 5, wherein the PGM algorithm models a pilot's decision to visually check an instrument as an event in a fully observable Recurrent Markov Chain.

7. The system of claim 1, wherein the visualization includes real-time updates of the cognitive state of the pilot, available attentional resources of the pilot, the attention allocation of the pilot, the situational awareness of the pilot and relevant aircraft parameters associated with the aircraft state data.

8. The system of claim 1, wherein the one or more processors are configured to determine the situational awareness including comparing the attention allocation of the pilot with critical flight information.

9. A method for determining pilot cognitive states, comprising:

receiving, from a plurality of sensors, physiological data from a pilot;

receiving, from an aircraft state data generator, aircraft state data;

determining a cognitive state of the pilot based on the physiological data;

determining available attentional resources of the pilot based on the cognitive state;

determining attention allocation of the pilot based on the available attentional resources and gaze patterns derived from the physiological data, wherein determining the attention allocation comprises projecting a three-dimensional probabilistic view cone based on the gaze patterns onto a two-dimensional surface to calculate a probability of gaze intersection with each of a plurality of cockpit objects;

determining situational awareness of the pilot based on the attention allocation and the aircraft state data, wherein determining the situational awareness comprises tracking, using a Probabilistic Graphical Model (PGM) algorithm, a time elapsed since each of a plurality of flight instruments was last observed by the pilot and changes in readings of each of the plurality of flight instruments since the last observation; and generating a visualization of the available attentional resources of the pilot, the attention allocation of the pilot, the situational awareness of the pilot, and aircraft state data.

10. The method of claim 9, further comprising preprocessing the physiological data by performing one or more of: removing not a number (NAN) values, applying bandpass filtering, rejecting outliers, or performing linear interpolation of missing values.

11. The method of claim 9, wherein determining the cognitive state comprises:

tracking, using multiple Kalman filters, different hypotheses about the cognitive state to generate one or more outputs;

combining the one or more outputs of these Kalman filters using a Gaussian Mixture Model (GMM), wherein each Kalman filter's output is represented as a Gaussian component; and dynamically adjusting one or more weights of the Gaussian component based on the physiological data and aircraft state data.

12. The method of claim 11, wherein the PGM algorithm estimates a probability that the pilot is aware of a current state of each instrument based on a time elapsed since the instrument was last observed and a magnitude of change in the instrument's reading since the last observation.

13. The method of claim 9, wherein the PGM algorithm models a pilot's decision to visually check an instrument as an event in a fully observable Recurrent Markov Chain, wherein state progression of the Recurrent Markov Chain denotes time elapsed since information internalization and resets occur at stochastic intervals based on fixation duration.

14. The method of claim 9, wherein generating the visualization includes generating real-time graphical representations of the available attentional resources of the pilot, the attention allocation of the pilot, the situational awareness of the pilot and relevant aircraft parameters associated with the aircraft state data.

15. The method of claim 9, wherein determining the situational awareness comprises comparing the pilot's attention allocation of the pilot with critical flight information.

16. A non-transitory computer-readable medium storing instructions that, when executed by one or more processors, cause the one or more processors to:

determine a cognitive state of a pilot based on physiological data using a Gaussian Mixture Model (GMM) that combines outputs from a plurality of Kalman filters, wherein each Kalman filter of the plurality of Kalman filters represents a different hypothesis about the cognitive state of the pilot;

determine available attentional resources of the pilot based on the cognitive state;

determine attention allocation of the pilot based on the available attentional resources and gaze patterns derived from the physiological data;

determine situational awareness of the pilot based on the attention allocation and aircraft state data; and generate a visualization of the available attentional resources of the pilot, the attention allocation of the pilot, the situational awareness of the pilot, and the aircraft state data.

17. The non-transient, computer-readable medium of claim 16, wherein the one or more processors are configured to dynamically adjust a weight of each Gaussian component of the GMM in real-time based on a match between predictions of a corresponding Kalman filter and incoming physiological data from the pilot.

18. The non-transient, computer-readable medium of claim 16, wherein the one or more processors are configured to implement a Probabilistic Graphical Model (PGM) algorithm to track a pilot's current knowledge of flight variables.

19. The non-transient, computer-readable medium of claim 16, wherein the one or more processors are configured to provide real-time graphical representations of the available attentional resources of the pilot, the attention allocation of the pilot, the situational awareness of the pilot and relevant aircraft parameters associated with the aircraft state data.

20. The non-transient, computer-readable medium of claim 16, wherein the one or more processors are configured to determine the situational awareness including comparing the attention allocation of the pilot with critical flight information.

* * * * *